United States Patent
Hosotani et al.

(10) Patent No.: US 10,181,755 B2
(45) Date of Patent: Jan. 15, 2019

(54) WIRELESS POWER SUPPLY APPARATUS

(71) Applicant: MURATA MANUFACTURING CO., LTD., Kyoto-fu (JP)

(72) Inventors: Tatsuya Hosotani, Kyoto-fu (JP); Tatsuya Doi, Ashikaga (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 391 days.

(21) Appl. No.: 14/861,324

(22) Filed: Sep. 22, 2015

(65) Prior Publication Data
US 2016/0013667 A1    Jan. 14, 2016

Related U.S. Application Data

(63) Continuation of application No. PCT/JP2014/057975, filed on Mar. 24, 2014.

(30) Foreign Application Priority Data

Mar. 27, 2013 (JP) .................................. 2013-067065

(51) Int. Cl.
*H02J 5/00* (2016.01)
*H04B 5/00* (2006.01)
(Continued)

(52) U.S. Cl.
CPC .......... *H02J 50/12* (2016.02); *H01F 27/2804* (2013.01); *H01F 38/14* (2013.01);
(Continued)

(58) Field of Classification Search
CPC .. H02J 50/12; H02J 50/80; H02J 50/10; H02J 50/40; H02J 50/70; H02J 5/005; H02J 17/00; H01F 27/2804; H01F 38/14
(Continued)

(56) References Cited

U.S. PATENT DOCUMENTS

| | | | |
|---|---|---|---|
| 6,476,766 B1* | 11/2002 | Cohen | H01Q 1/243 343/700 MS |
| 2008/0088903 A1* | 4/2008 | Matteo | H01Q 1/36 359/227 |

(Continued)

FOREIGN PATENT DOCUMENTS

| | | |
|---|---|---|
| JP | 2008-206327 A | 9/2008 |
| JP | 2008-271496 A | 11/2008 |

(Continued)

OTHER PUBLICATIONS

International Search Report and Written Opinion of the International Searching Authority, PCT/JP2014/057975, dated May 20, 2014.
(Continued)

*Primary Examiner* — Brandon S Cole
(74) *Attorney, Agent, or Firm* — Studebaker & Brackett PC

(57) ABSTRACT

A power transmitter and a power receiver are disposed with a space provided therebetween, and a power transmission device produces an electromagnetic field that periodically changes using the AC current in a space and forms a vibrating electromagnetic resonance field in which the space itself has energy. By obtaining electrical energy from the resonance field, a power reception device produces a resonance current, and a new electromagnetic resonance field is formed by the resonance current. The power transmission device or the power reception device is constituted of a conductor having a Peano curve shape that covers a surface having a given spread by passing through all regions obtained by dividing the surface having a given spread without intersecting with itself, and the electromagnetic field energy of a space in the periphery of the fractal-shaped device is increased.

21 Claims, 21 Drawing Sheets

(51) Int. Cl.
    *H04B 7/00*             (2006.01)
    *H01L 23/00*           (2006.01)
    *H01L 23/22*           (2006.01)
    *H01L 23/538*         (2006.01)
    *H01Q 3/00*           (2006.01)
    *H02J 50/12*           (2016.01)
    *H02J 50/70*           (2016.01)
    *H02J 50/40*           (2016.01)
    *H01F 38/14*           (2006.01)
    *H01F 27/28*           (2006.01)
    *H02J 50/10*           (2016.01)
    *H02J 50/80*           (2016.01)

(52) U.S. Cl.
    CPC .............. *H02J 50/10* (2016.02); *H02J 50/40* (2016.02); *H02J 50/70* (2016.02); *H02J 50/80* (2016.02)

(58) Field of Classification Search
    USPC .................................................. 307/89–112
    See application file for complete search history.

(56) References Cited

U.S. PATENT DOCUMENTS

| | | | |
|---|---|---|---|
| 2008/0227478 A1* | 9/2008 | Greene | G06K 19/0701 455/522 |
| 2008/0252530 A1 | 10/2008 | Bae et al. | |
| 2012/0306281 A1 | 12/2012 | Bohori et al. | |
| 2012/0306701 A1 | 12/2012 | Popugaev et al. | |
| 2013/0119774 A1* | 5/2013 | Ichikawa | B60L 11/123 307/104 |
| 2013/0201068 A1* | 8/2013 | Alexopoulos | H01Q 15/0006 343/750 |
| 2013/0248936 A1* | 9/2013 | Alexopoulos | H01Q 1/2283 257/204 |
| 2015/0380355 A1* | 12/2015 | Rogers | H01L 23/538 257/773 |
| 2016/0187520 A1* | 6/2016 | Widmer | G01V 3/101 324/227 |

FOREIGN PATENT DOCUMENTS

| | | |
|---|---|---|
| JP | 2011-160499 A | 8/2011 |
| JP | 2012-503959 A | 2/2012 |
| JP | 2012-222826 A | 11/2012 |
| JP | 2012-254006 A | 12/2012 |

OTHER PUBLICATIONS

Tu et al, "Performance of High-Reliability and High-Linearity InGaP/GaAs HBT PAs for Wireless Communication", IEEE Transactions on Electron Devices, vol. 57, No. 1, Jan. 2010.

Y. Horii; "Scattering characteristics of the fractal filter based on Peano curve"; Proceedings of the 1999 ELEC; 1999; p. 83; Japan; with English language translation.

Junki Ohasa et al.; "Study on Wireless Power Transmission via Fractal Antenna"; IEICE Technical Report WPT2012-16; Aug. 2012; pp. 7-12; The Institute of Electronics, Informatoin and Communication Engineers; Japan. URL http://www.ieice.org/~wpt/paperWPT2012-16.pdf.

* cited by examiner

FIG. 1
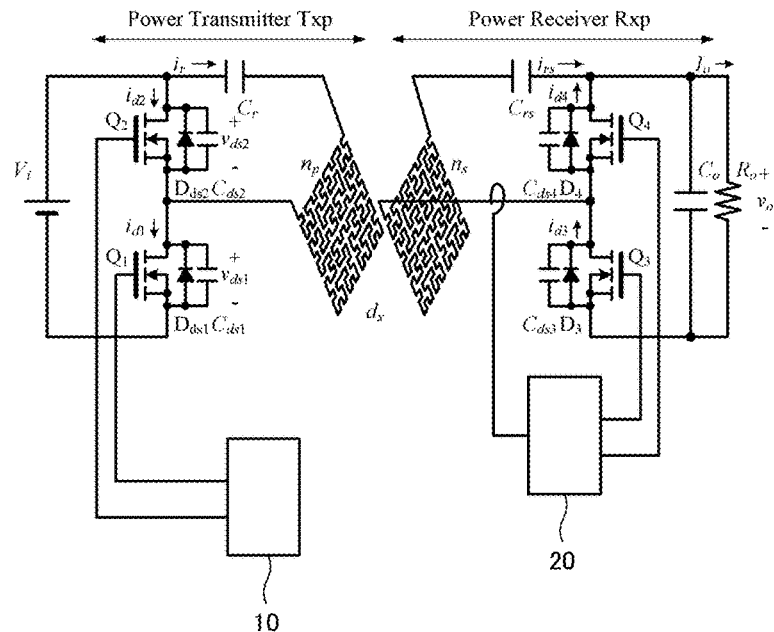
FIG. 2
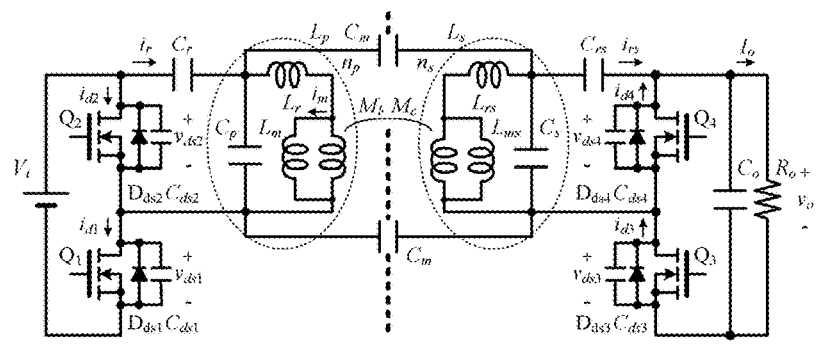
FIG. 3
(a) n=1
FIG. 3
(b) n=2
FIG. 3
(c) n=3
FIG. 3
(d) n=4
FIG. 3
(e) n=5
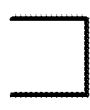
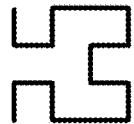
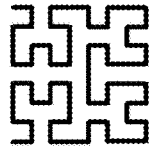
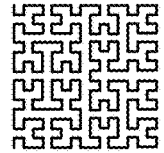
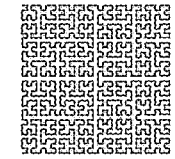

FIG. 7 ( A )
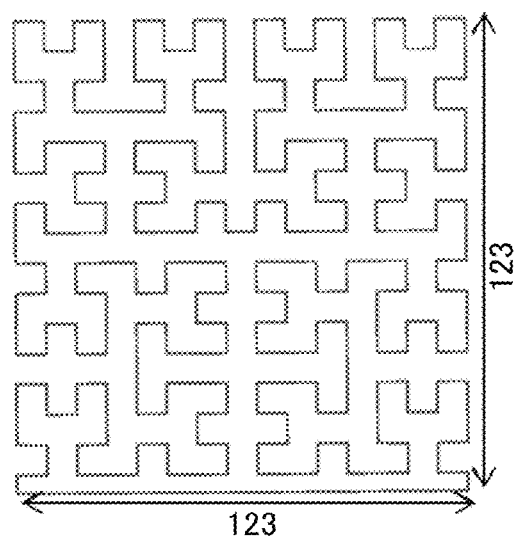
FIG. 7 ( B )
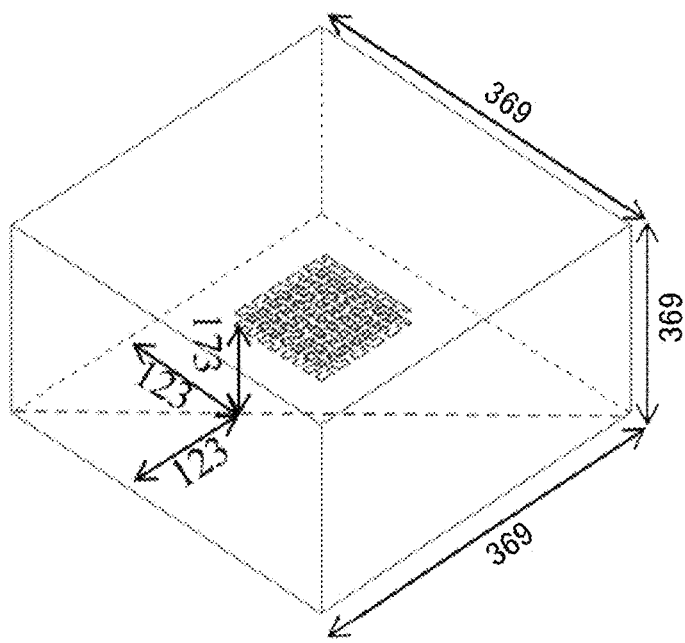

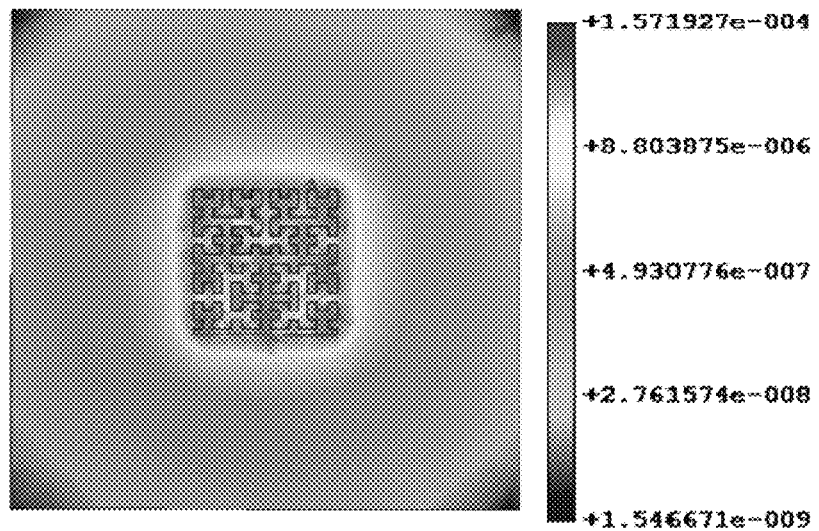
FIG. 8 ( A )
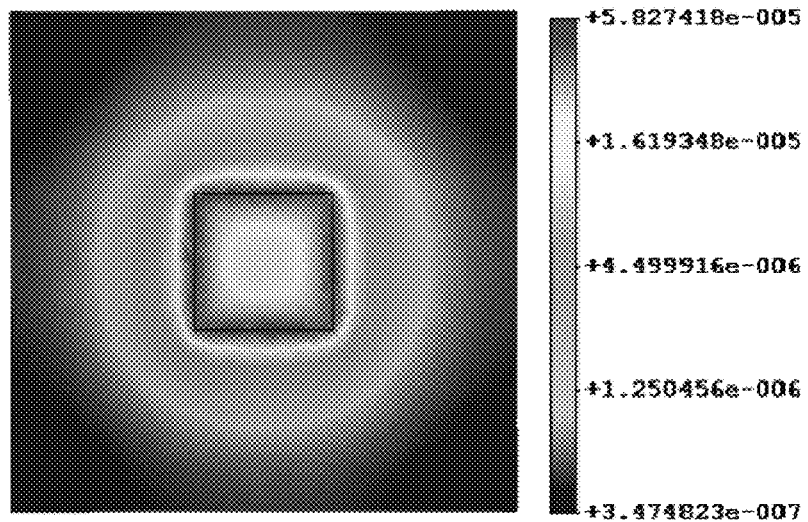
FIG. 8 ( B )

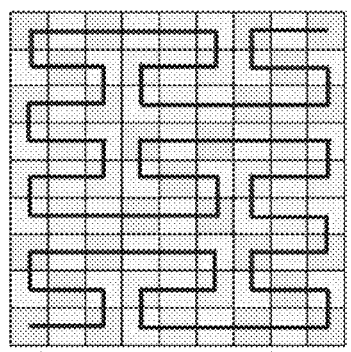
FIG.11 ( A )
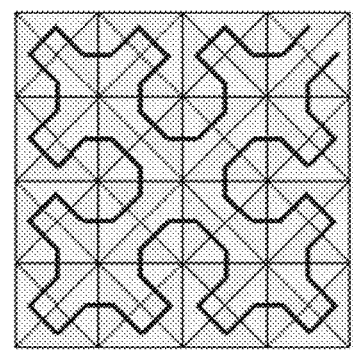
FIG.11 ( D )
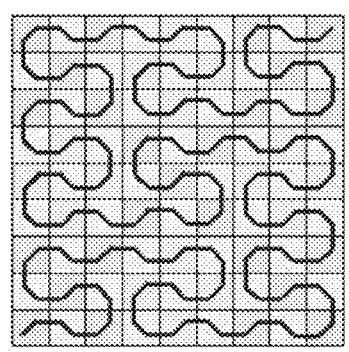
FIG.11 ( B )
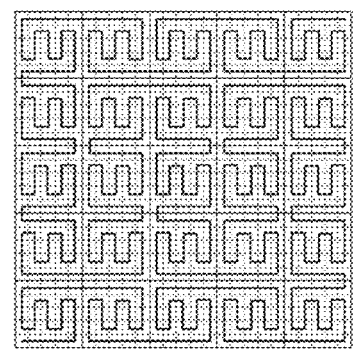
FIG.11 ( E )
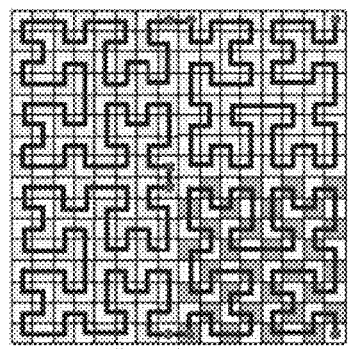
FIG.11 ( C )

FIG.12 ( a ) n=1
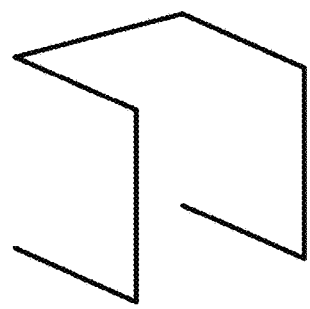
FIG.12 ( b ) n=2
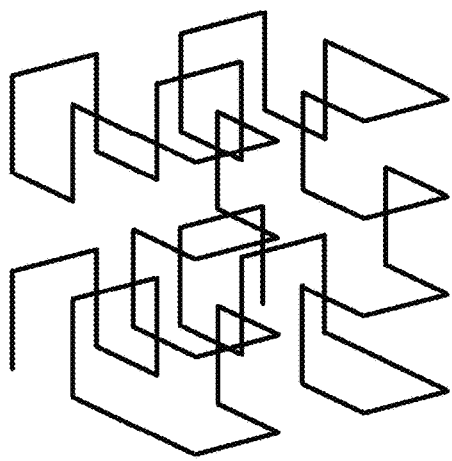
FIG.12 ( c ) n=3
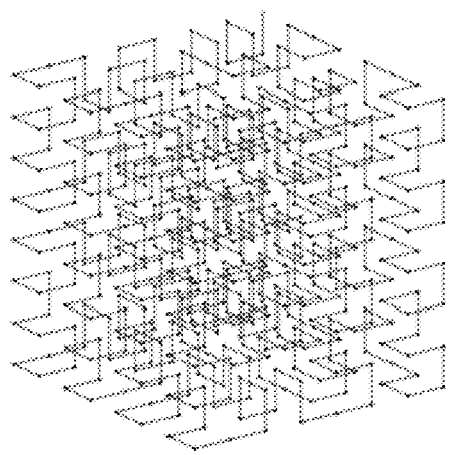
FIG.12 ( d ) n=3
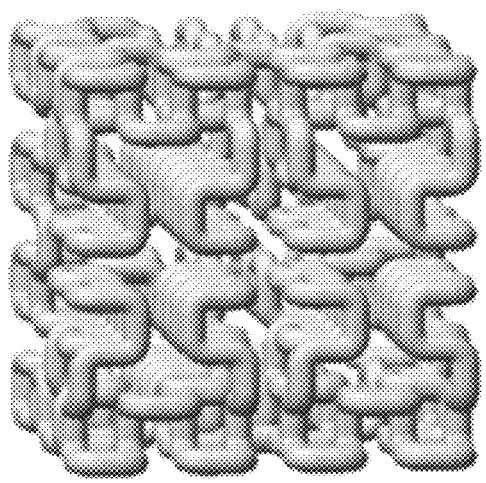

FIG.17( A )
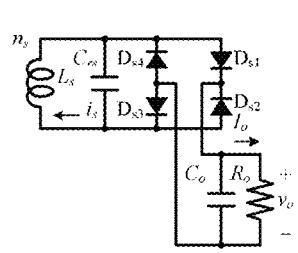
FIG.17( B )
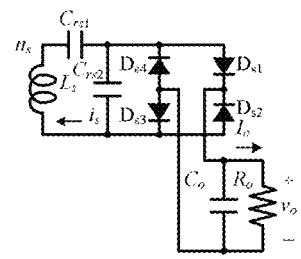
FIG.18( A )
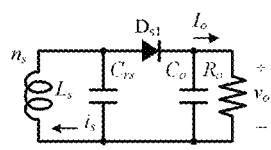
FIG.18( B )
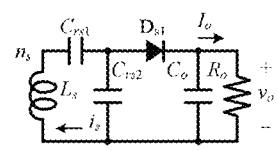
FIG.19( A )
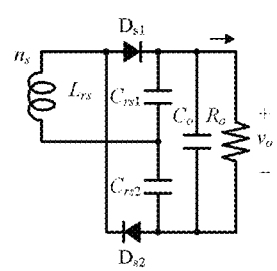
FIG.19( B )
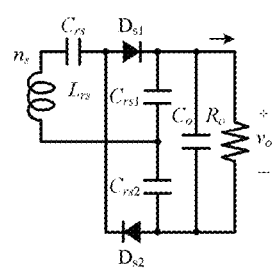
FIG.20( A )
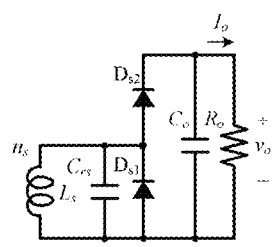
FIG.20( B )
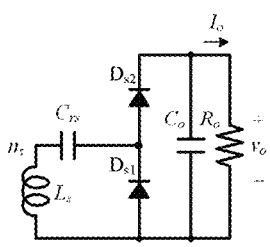

FIG. 21 ( A )     FIG. 21 ( B )
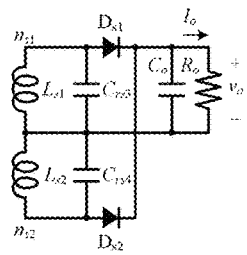 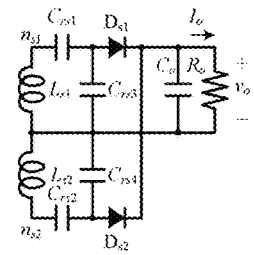
FIG. 22
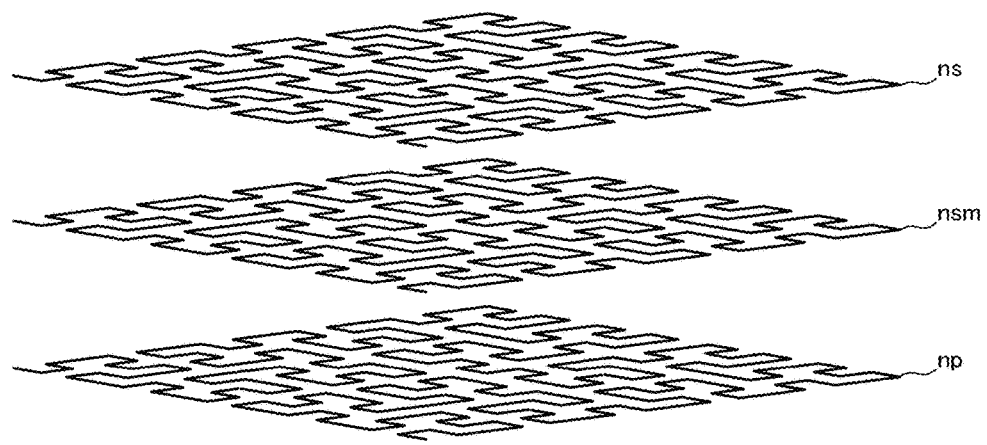
FIG. 23
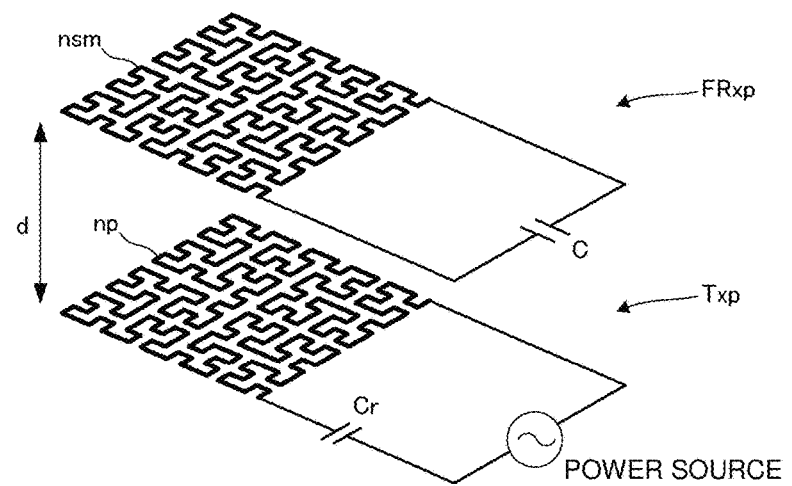

WIRELESS POWER SUPPLY APPARATUS

CROSS REFERENCE TO RELATED APPLICATION

This application claims benefit of priority to Japanese Patent Application No. 2013-067065 filed Mar. 27, 2013, and to International Patent Application No. PCT/JP2014/057975 filed on Mar. 24, 2014, the entire content of which is incorporated herein by reference.

TECHNICAL FIELD

The present disclosure relates to a wireless power supply apparatus that includes a power transmitter and a power receiver.

BACKGROUND

Recent increases in miniaturization, lighter weights, and reduced power consumption in electronic devices have, along with increases in battery capacities, led to a proliferation of battery-powered electronic devices. There has also been an increase in usage systems where data communication is carried out wirelessly between devices at close range. In light of such circumstances, power supply techniques for supplying power at close ranges are also garnering attention.

For example, a conventional non-contact charging system such as that disclosed in Japanese Unexamined Patent Application Publication No. 2008-206327 is constituted by a power transmitter including a primary-side coil in a charging platform or the like and a mobile electronic device including a secondary coil and a charging-type battery, and a user places the mobile electronic device on the power transmitter. Through this, the primary coil of the power transmitter and the secondary coil of the mobile electronic device undergo electromagnetic inductive coupling (magnetic field coupling), and power is supplied to the device being charged so as to charge a secondary battery.

SUMMARY

Technical Problem

In the non-contact charging system disclosed in Japanese Unexamined Patent Application Publication No. 2008-206327, the transmitter coil and the receiver coil act as an insulated transformer using electromagnetic induction, and are merely used as a transformer employing magnetic coupling. In a transformer that uses electromagnetic induction, a magnetic flux generated by a current that flows in a primary winding is made to interlink with a secondary winding so as to cause a current to flow therein, and thus it is important to efficiently convert electricity to magnetism and then convert the magnetism to electricity.

In a wireless power supply system that employs electromagnetic induction, how the magnetic coupling between the primary winding and the secondary winding is increased is important with respect to increasing the power conversion efficiency. However, in order to prevent magnetic saturation or because of physical limitations, it is often the case that it is difficult to increase the degree of magnetic coupling of a transformer, and as a consequence, a high power conversion efficiency cannot be achieved.

The present disclosure relates to an apparatus that supplies power wirelessly by forming an electromagnetic field resonance coupling. The following problems exist in the case where power is supplied wirelessly through electromagnetic field resonance coupling.

(a) In electromagnetic field resonance techniques, a helical coil, a device, a spiral coil, a meandering antenna, or the like can be used in power transmission and reception devices. However, in electromagnetic field resonance coupling, where coupling is achieved through resonation at high frequencies, the resonance frequency is greatly affected by stray capacitance, which is a capacitance component structurally present in a power transfer device. It is extremely difficult to manage and adjust such structurally-based stray capacitance in industrial applications, and thus there is demand for a technique for supplying power wirelessly by forming an electromagnetic field resonance coupling using a power transfer device having a simple structure.

(b) Thus far, in power transmitters and receivers using electromagnetic field resonance techniques, electromagnetic noise radiated from power transmission and reception devices has negatively affected peripheral devices, which has been an issue with respect to electromagnetic compatibility (EMC).

It is an object of the present disclosure to provide a wireless power supply apparatus that has a simple configuration and is capable of ensuring a sufficient electromagnetic compatibility (EMC).

Solution to Problem

A wireless power supply apparatus according to the present disclosure is configured as follows.

(1) A wireless power supply apparatus includes: a power transmitter having a power source that supplies an AC current and a power transmission device electrically connected to the power source;

a power receiver having a load that consumes electrical energy and a power reception device electrically connected to the load;

a power transmission resonance circuit constituted by an inductive impedance and a capacitive impedance of the power transmission device, and by an external impedance electrically connected as necessary;

a power reception resonance circuit constituted by an inductive impedance and a capacitive impedance of the power reception device, and by an external impedance electrically connected as necessary; and a power reception load circuit that is electrically connected to the power reception resonance circuit and that supplies electrical energy produced by an AC current to the load.

Here, the power transmitter and the power receiver are disposed with a space provided therebetween;

the power transmission device produces an electromagnetic field that periodically changes using the AC current in a space, and forms a vibrating electromagnetic resonance field in which the space itself has energy;

the power reception device provides an AC current by obtaining electrical energy from the resonance field and forms a new electromagnetic resonance field using the AC current; and the power transmission device or the power reception device is constituted of a conductor having a Peano curve shape, which is a space filling curve, that covers a surface having a given spread by passing through all of the regions obtained by dividing the surface having a given spread without intersecting with itself, and the electromagnetic field energy of a space where the power transmission device and the power reception device are disposed is increased locally.

According to this configuration, the following effects are achieved.

By using a Peano curve-shaped conductor, the electromagnetic resonance field can be suppressed from expanding unnecessarily, and the electromagnetic field energy can be stored.

A parasitic inductive impedance or capacitive impedance of the Peano curve-shaped conductor can be used as an electric circuit parameter for forming the electromagnetic resonance field.

By using a Peano curve-shaped conductor as a device that directly converts electrical energy and electromagnetic field energy, energy loss can be reduced and the efficiency of the wireless power supply apparatus can be increased.

Unnecessary expansion of the electromagnetic field energy can be suppressed while realizing a target wireless power supply.

By using a Peano curve-shaped conductor, radiated electromagnetic noise can be suppressed, the electromagnetic compatibility can be improved, and negative effects on people and peripheral devices can be suppressed.

(2) It is preferable that the resonance field be formed in a range of no greater than ⅕ the product of a switching period Ts (sec), which is an inverse of a frequency fs of the AC current, and the speed of light (approximately 300,000 km/s), from the power transmission device or the power reception device. According to this configuration, a resonance field is formed within a range ⅕ the wave length from each coil, and thus wireless power supply can be carried out appropriately within that range.

(3) It is preferable that the wireless power supply apparatus further include a field resonator having at least one resonance device disposed in a near-field space where the power transmission device and the power reception device are present, and a resonance/resonating circuit constituted by an inductive impedance and a capacitive impedance of the resonance device or an external impedance;

that the resonance device produce an AC current by obtaining electrical energy from the resonance field and form a new electromagnetic resonance field using the AC current; and that the resonance device be constituted of a conductor having a Peano curve shape, which is a space filling curve, that covers a surface having a given spread by passing through all of the regions obtained by dividing the surface having a given spread without intersecting with itself, and the electromagnetic field energy of a space where the resonance device is disposed be increased locally.

According to this configuration, the following effects are achieved.

By using a Peano curve-shaped conductor, the electromagnetic resonance field can be suppressed from expanding unnecessarily, and the electromagnetic field energy can be stored.

A parasitic inductive impedance or capacitive impedance of the Peano curve-shaped conductor can be used as an electric circuit parameter for forming the electromagnetic resonance field.

Expansion of the electromagnetic field energy can be suppressed while realizing a target wireless power supply.

By using a Peano curve-shaped conductor, radiated electromagnetic noise can be suppressed, the electromagnetic compatibility can be improved, and negative effects on people and peripheral devices can be suppressed.

(4) It is preferable that the conductor of the power transmission device or the power reception device have a step (generation) number n of two or more, and that an outer shape thereof be essentially square or essentially cubic.

(5) It is preferable that the conductor of the resonance device have a step (generation) number n of two or more, and that an outer shape thereof be essentially square or essentially cubic.

According to the configurations in the stated (4) and (5), the following effects are achieved.

By employing a square shape, the percentage of space filled by the space filling curve can be increased.

By employing what is essentially a cube, a device that handles three-dimensional directions can be configured.

(6) It is preferable that the conductor of the power transmission device be a Peano curve-shaped conductor whose step (generation) number n is different from that of the conductor of the power reception device as necessary.

This configuration makes it possible to accommodate limitations in the placement of devices.

(7) It is preferable that the conductor of the resonance device be a Peano curve-shaped conductor whose step (generation) number n is different from that of the conductor of the power transmission device or the power reception device as necessary.

This configuration makes it possible to accommodate limitations in the placement of devices.

(8) It is preferable that the power reception load circuit have a rectifying circuit and supply DC electrical energy to the load.

According to this configuration, DC electrical energy can be supplied to the load, and by supplying a DC voltage, power can be supplied to a plurality of loads by connecting the loads in parallel.

(9) It is preferable that the switching control circuit provide a relationship of fs=fr±30% for a switching frequency fs relative to a resonant frequency fr at which an imaginary part X of an equivalent input impedance when a load side is viewed as a whole from the input to which the power transmission switching circuit of the power transmission resonance circuit is connected becomes 0. Through this, the switching is carried out at a resonant frequency at which the imaginary part X of the equivalent input impedance when the load side is viewed as a whole from the input of the power transmission resonance circuit becomes 0, and thus a high-energy resonance field can be formed.

(10) It is preferable that resonant frequencies independently present in the power transmission resonance circuit and the power reception resonance circuit match within a range of ±30%. This makes it easy to set the frequency of the AC current that forms the resonance field.

(11) It is preferable that resonant frequencies independently present in the power transmission resonance circuit and the resonance/resonating circuit match within a range of ±30%. This makes it easy to set the frequency of the AC current that forms the resonance field.

(12) It is preferable that a plurality of field resonators be disposed in the near-field space. By disposing a plurality of the field resonators in the near-field space where the power transmission device and the power reception device are present, the resonance field can be effectively expanded and the degree of freedom with which the power transmitter and the power receiver can be positioned can be increased.

(13) It is preferable that resonant frequencies independently present in the plurality of resonance/resonating circuits match within a range of ±30%. This makes it easy to expand the resonance field.

(14) It is preferable that a plurality of the power transmitters be disposed, and that a frequency of the AC current of each power transmitter be the same within a ±30% range. By disposing a plurality of the power transmitters, the resonance field can be expanded, and by setting the frequencies of the AC currents in the respective power transmitters to be essentially the same, the electromagnetic field energy of the resonance field can be increased.

(15) It is preferable that a plurality of the power receivers be disposed, and that a resonant frequency of the power reception resonance circuit each power receiver has be the same within a ±30% range. By disposing a plurality of the power receivers, the resonance field can be expanded, and the plurality of the power receivers can obtain a greater amount of electrical energy.

(16) It is preferable that a plurality of the power reception devices be disposed, and that electrical energy received by the respective power reception devices be collected and supplied to a load. Through this, the amount of electrical energy that can be supplied to a load can be increased easily.

(17) It is preferable that a plurality of the power transmitters be disposed, and that a switching frequency of each power transmitter be an ISM (Industry-Science-Medical) band. Through this, interference caused by electromagnetic noise to peripheral devices can be suppressed, and electromagnetic compatibility (EMC) can be achieved.

(18) It is preferable that the power transmitter include a filter that removes frequency components aside from the switching frequency. Through this, interference caused by electromagnetic noise to peripheral devices can be suppressed, and electromagnetic compatibility can be achieved.

(19) It is preferable that the power transmitter and the power receiver each include a certified signal circuit that communicates via radio waves. Through this, the power transmitter and the power receiver have dual roles of transmitting power and emitting signals, and thus the apparatus can be made smaller in size and lighter in weight. Furthermore, an appropriate amount of power can be transmitted from the power transmitter to an appropriate power receiver at an appropriate timing.

(20) It is preferable that the field resonator include a certified signal circuit that communicates via radio waves with the power transmitter or the power receiver. Through this, the field resonator has a dual role of transmitting power and emitting signals, and thus the apparatus can be made smaller in size and lighter in weight. In addition, an appropriate amount of power can be received easily by the power receiver communicating with the appropriate target power transmitter at an appropriate timing.

Advantageous Effects of Disclosure

According to the present disclosure, the following effects are achieved.

The Peano curve basic shape element (a shape at step number n=1) functions as a differential coil, and thus unnecessary expansion of the electromagnetic resonance field can be suppressed and the electromagnetic field energy can be stored.

The surface area of each line length is small, and thus the device can be miniaturized.

The self-inductance of the fractal device as a whole is lower than in the case where a simple square coil (or circular coil) is used. Accordingly, it is not necessary to reduce the size in order to achieve a desired inductance, and a predetermined coupling can be achieved between devices that are distanced from each other to a certain extent.

BRIEF DESCRIPTION OF THE DRAWINGS

FIG. 1 is a circuit diagram illustrating a wireless power supply apparatus according to a first embodiment.

FIG. 2 is a circuit diagram illustrating a power transmission device np and a power reception device ns of the wireless power supply apparatus according to the first embodiment as equivalent circuits.

FIG. 3(a) through 3(e) are diagrams is a diagram illustrating examples of conductor patterns in a fractal-shaped device.

FIG. 7(A) is a diagram illustrating a conductor pattern and a size thereof in the power transmission device ns and the power reception device np. FIG. 7(B) is a diagram illustrating a FEM (finite element method) simulation model.

FIG. 8(A) is a diagram illustrating a magnetic flux density distribution in the power reception device np and the periphery thereof. FIG. 8(B) is a diagram illustrating a magnetic flux density distribution in a power reception device and the periphery thereof according to a comparative example.

FIGS. 11(A) to (E) are diagrams illustrating linear conductor patterns formed from Peano curves having different primary shapes, and illustrate patterns at predetermined step numbers.

FIG. 12(a) through 12(d) are diagrams illustrating a conductor pattern formed from a three-dimensional Peano curve.

FIG. 17(A) and FIG. 17(B) are circuit diagrams illustrating power receivers in a wireless power supply apparatus in which a power receiving-side rectifier circuit is configured as a diode bridge circuit using diodes Ds1, Ds2, Ds3, and Ds4.

FIG. 18(A) and FIG. 18(B) are circuit diagrams illustrating power receivers in a wireless power supply apparatus in which a power receiving-side rectifier circuit is configured as a half-wave rectifier circuit.

FIG. 19(A) and FIG. 19(B) are circuit diagrams illustrating power receivers in a wireless power supply apparatus in which a power receiving-side rectifier circuit is configured as a voltage doubler rectifier circuit.

FIG. 20(A) and FIG. 20(B) are circuit diagrams illustrating power receivers in a wireless power supply apparatus in which a power receiving-side rectifier circuit is configured as a voltage doubler rectifier circuit.

FIG. 21(A) and FIG. 21(B) are circuit diagrams illustrating power receivers in a wireless power supply apparatus in which the power receivers are configured including power reception devices ns1 and ns2 having center taps.

FIG. 22 is a diagram illustrating a resonance device nsm disposed between the power transmission device np and the power reception device ns.

FIG. 23 is a diagram illustrating a state in which a field resonator FRxp is disposed nearby a power transmitter Txp.

DETAILED DESCRIPTION

First Embodiment

FIG. 1 is a circuit diagram illustrating a wireless power supply apparatus according to a first embodiment. Meanwhile, FIG. 2 is a circuit diagram illustrating a power transmission device np and a power reception device ns of this wireless power supply apparatus as equivalent circuits.

A feature of the wireless power supply apparatus illustrated in FIG. 1 and FIG. 2 is as follows.

The configuration employs a Peano-shape device in the power transmission and reception devices.

The configuration converts DC electrical energy and electromagnetic field energy.

The configuration forms an electromagnetic resonance field.

The configuration has a switching element carrying out a ZVS (zero voltage switching) operation.

Viewed as geometric shapes, the power transmission device np and the power reception device ns are both fractal-shaped devices formed from conductor patterns in which parts have self-similarity with the whole. First, the configurations of the power transmission device np and the power reception device ns will be described with reference to FIG. 3. FIG. 3 is a diagram illustrating examples of conductor patterns in a fractal-shaped device. FIG. 3(a) indicates a pattern when a number of steps (generations) is (n=1), FIG. 3(b) a pattern when n=2, FIG. 3(c) a pattern when n=3, FIG. 3(d) a pattern when n=4, and FIG. 3(e) a pattern when n=5. These patterns are also patterns obtained by using the basic shape illustrated in FIG. 3(a) as a generator and recursively carrying out an operation that replaces each line segment with a form analogous to the generator.

The example illustrated in FIG. 3 is a "space filling curve" that covers a surface having a given spread with a continuous curve, proposed by the mathematician J. Peano (1858-1932). Here, a "space filling curve" can refer to a line that covers a surface having a given spread by passing through all of the regions obtained by (equally) dividing a surface having a given spread without intersecting with itself. In other words, the curve has regularity in which the lines and the regions obtained through the division correspond one-to-one. As a result, when viewed as a geometric shape, the shape is a fractal shape in which "parts have self-similarity with the whole". The curves illustrated in FIG. 3 are space filling curves devised by the German mathematician David Hilbert in 1891, and are called Hilbert curves. In two dimensions, a Hilbert curve is a curve that traverses regions (grids) in sides of 2^n so as to pass through all points while connecting adjacent regions without exception. For example, a five-step Hilbert curve traverses all grids when there are 64×64 grids (sides of 2^6).

Note that "space filling curves" are generally taken as Peano curves, even if the curve was not specifically proposed by Peano himself.

Figure 4:
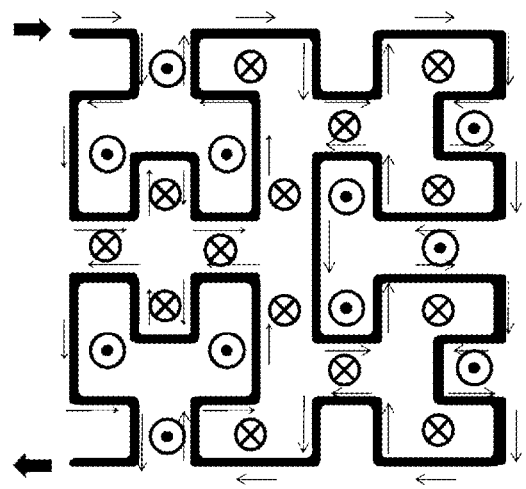
FIG. 4 is a diagram illustrating an example of a direction of current flowing in a conductor pattern of the power transmission device np and the power reception device ns and a direction of a magnetic flux distributed along the conductor pattern.

FIG. 4 is a diagram illustrating an example of a direction of current flowing in a conductor pattern of the power transmission device np and the power reception device ns and a direction of a magnetic flux distributed along the conductor pattern. In this example, the power transmission device np and the power reception device ns have the same structure. Arrows in FIG. 4 illustrate directions of instantaneous magnetic flux density vectors.

In the basic shape element (the shape at step number n=1), the magnetic flux is present locally, and thus a local self-inductance that mutually cancels out an induced voltage is distributed across the surface. Accordingly, as the number of steps n increases, regions in which the polarity of the magnetic field is inverted are interspersed, forming a differential coil structure in all locations. As such, the magnetic flux is closed locally, making it difficult for the magnetic flux to spread to areas distanced from the device. In other words, the magnetic fluxes coupling at each area are closed in the vicinity of the power transmission device np and the power reception device ns, and do not diffuse. Meanwhile, a power transmission efficiency is at a maximum when the conductor patterns of the power transmission device np and the power reception device ns are opposed to each other.

Figure 5:
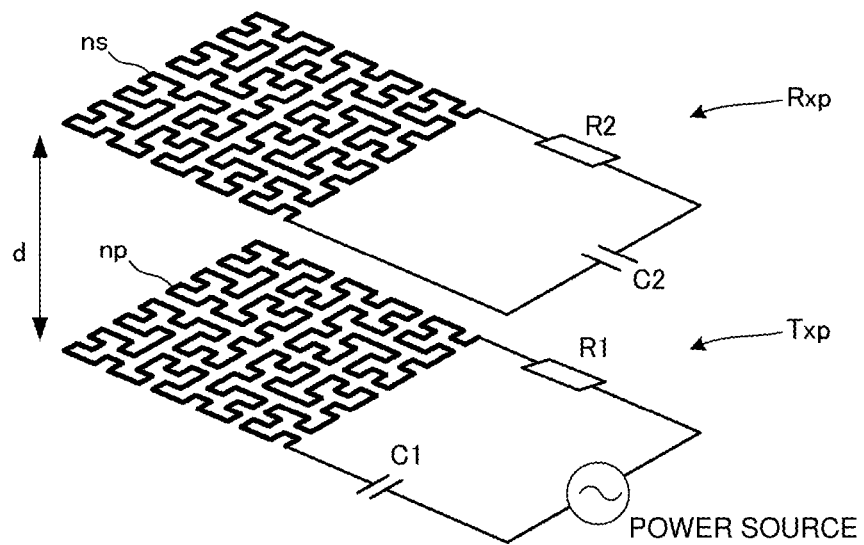
FIG. 5 is a diagram illustrating a state in which a power receiver Rxp is disposed nearby a power transmitter Txp.

FIG. 5 is a diagram illustrating a state in which a power receiver Rxp is placed nearby a power transmitter Txp. The power reception device ns has the same configuration as the power transmission device np. Circuits connected to the power transmission device np and the power reception device ns are as illustrated in FIG. 1 and FIG. 2. However, pure resistance elements R1 and R2 and capacitors C1 and C2 are connected to each conductor pattern here, as a model for simulations that will be described later. An interterminal resistance of the pure resistances was set to 10Ω. Meanwhile, the capacitances of the capacitors C1 and C2 were set to 6.11 nF so that resonant frequencies of a resonance circuit including the power transmission device np and a resonance circuit including the power reception device ns were both 700 kHz.

The self-inductances of the power transmission device np and the power reception device np found as a result of the simulation were 8.46 µH, with measured values of 14.3 µH (at 1 kHz, LCR meter), and thus an adequate result was obtained.

Figure 6:
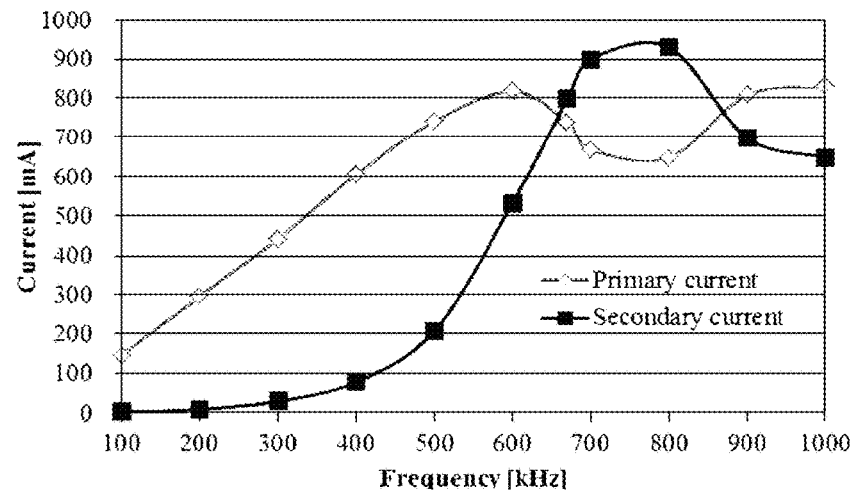
FIG. 6(A) and FIG. 6(B) illustrate results of measuring frequency characteristics of a current (primary current) flowing in the power transmission device np and a current (secondary current) flowing in the power reception device ns.
Figure 6:
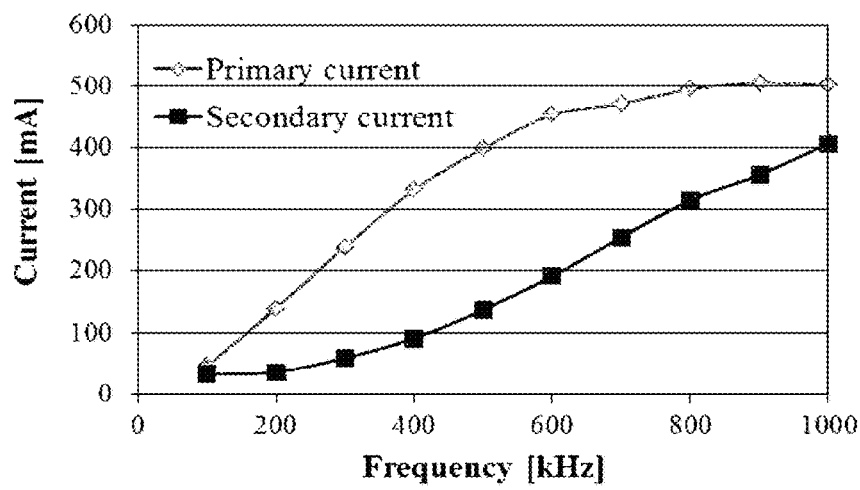

FIG. 6(A) and FIG. 6(B) illustrate results of measuring frequency characteristics of a current (primary current) flowing in the power transmission device np and a current (secondary current) flowing in the power reception device ns. FIG. 6(A) indicates a device formed from wire, whereas FIG. 6(B) indicates a device manufactured by forming a wire pattern in a resin base material.

In the result indicated in FIG. 6(A), the current flowing in the power reception device ns peaks near 700 kHz. This is because near 700 kHz, a reactance of an input impedance when viewing the power reception device from the power transmission device is almost 0, and an electromagnetic resonance field is formed as a result.

Next, a result of visualizing a magnetic flux density distribution of the power transmission device and the power reception device, simulating power transmission characteristics, and so on through magnetic field analysis taking into consideration displaced current using the FEM (finite element method) will be described. A three-dimensional FEM package Femtet (registered trademark) (Murata Software Co., Ltd.) was used as the simulator.

FIG. 7(A) is a diagram illustrating a conductor pattern and a size thereof in the power transmission device ns and the power reception device np. FIG. 7(B) is a diagram illustrating a FEM simulation model. The units are mm in both. Here, a distance between the power transmission device and the power reception device was set to 20 mm, the conductors were lead wires (pure copper) having circular cross-sectional areas, with the other regions being air. Infinite boundary conditions were applied to all side surfaces of a rectangular analysis region in FIG. 7(B). A power transmission device and a power reception device serving as a comparative example, which will be described later, were the same single-turn square coil in which the outer sizes of the power transmission device ns and the power reception device np were the same. The capacitance of the square coil was set to 34.9 nF so as to achieve a resonant frequency of 700 kHz.

FIG. 8(A) is a diagram illustrating a magnetic flux density distribution in the power reception device np and the periphery thereof. FIG. 8(B) is a diagram illustrating a magnetic flux density distribution in the power reception device and the periphery thereof according to the comparative example. As can be seen, when a fractal-shaped device having a Peano curve-shaped conductor is used, regions of high magnetic flux density spread across the entire surface where the conductor pattern is formed.

Figure 9:
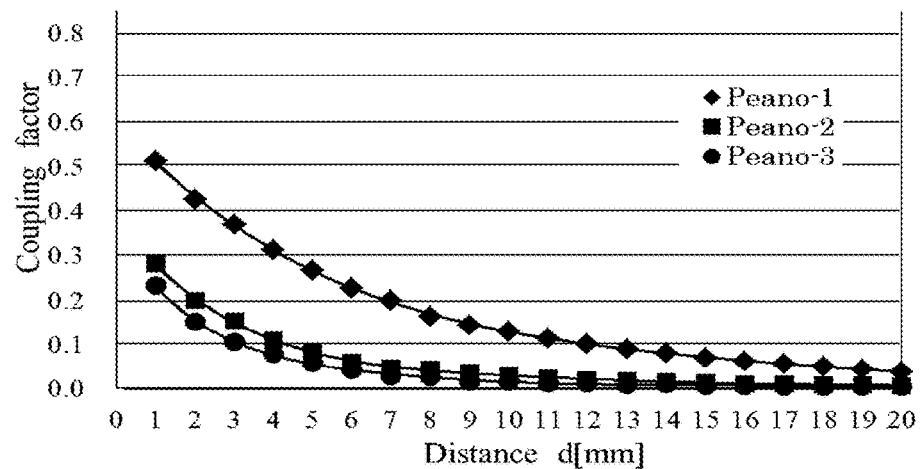
FIG. 9 is a diagram illustrating a relationship between a coupling factor and a distance from the power transmission device np to the power reception device ns.

FIG. 9 is a diagram illustrating a relationship between a coupling factor and a distance from the power transmission device np to the power reception device ns. Here, each characteristic line indicates characteristics of conductor patterns having different numbers of steps. "Peano-1" is a Peano curve where the step number n=2, "Peano-2" is a Peano curve where the step number n=3, and "Peano-3" is a Peano curve where the step number n=4; spatial division patterns and the paths of lines passing therethrough are the same as those illustrated in FIG. 3.

As is clear from FIG. 9, as the number of steps increases (the higher the order), the coupling factor can be reduced more with respect to the distance between the power transmission device np and the power reception device ns. In this manner, a fractal device in which the linear conductor has a Peano shape is suited to close-distance power transmission.

Note that according to such a fractal-shaped device, there is a quality in which an electromagnetic field is confined under specific conditions in GHz bands or greater, and that quality can also be employed.

Figure 10:
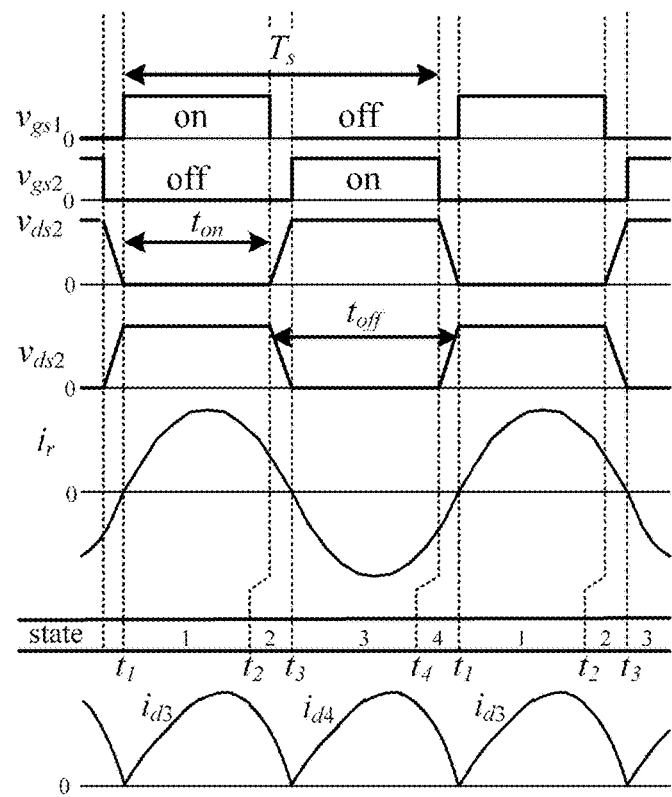
FIG. 10 is a diagram illustrating waveforms in various units in FIGS. 1 and 2.

Next, detailed operations of the wireless power supply apparatus illustrated in FIG. 1 and FIG. 2 will be described with reference to FIG. 10. FIG. 10 is a diagram illustrating waveforms in various units in FIGS. 1 and 2.

A mutual inductance of the power transmission device np is represented by Lm, a leakage inductance of the power transmission device np by Lr, a mutual inductance of the power reception device ns by Lms, and a leakage inductance of the power reception device ns by Lrs. Meanwhile, gate-source voltages of switch elements Q1 and Q2 are represented by vgs1 and vgs2, and drain-source voltages by vds1 and vds2.

The switch elements Q1 and Q2 turn on and off alternately between short dead times where both switch elements are off, and currents flowing in Q1 and Q2 during the dead time period are each commuted and undergo ZVS operations. Operations performed in respective states within a single switching period are as follows.

(1) State 1: Time t1 to t2

First, a diode Dds1 becomes conductive. During a period when the diode Dds1 is conductive, the ZVS operation is carried out by turning on the switch element Q1, and the switch element Q1 becomes conductive. The equivalent mutual inductances Lm and Lms and a mutual capacitance Cm are formed by mutual induction between the power transmission device np and the power reception device ns, and in a multi-resonant circuit constituted by Cr, Lr, Lm, Lms, Crs, and Lrs, a power transmission resonance circuit and a power reception resonance circuit resonate; a resonance current then flows in the mutual inductances Lm and Lms, an electromagnetic field resonance coupling is formed, and power is transmitted from the power transmission circuit to the power reception circuit. On the power transmission side, a resonance current flows in a capacitor Cr and the leakage inductance Lr. On the power reception side, a resonance current flows in a capacitor Crs and the leakage inductance Lrs, and power is supplied to a load after being rectified by switch elements Q3 and Q4.

The system goes to state 2 when the switch element Q1 is turned off.

(2) State 2: Time t2 to t3

On the power transmitter Txp side, a parasitic capacitor Cds1 is charged and a parasitic capacitor Cds2 is discharged by a current it flowing in the leakage inductance Lr. A diode Dds2 becomes conductive and the system goes to state 3 when a voltage vds1 becomes a voltage Vi and a voltage vds2 becomes 0 V.

(3) State 3: Time t3 to t4

First, the diode Dds2 becomes conductive. During a period when the diode Dds2 is conductive, the ZVS operation is carried out by turning on the switch element Q2, and the switch element Q2 becomes conductive. The equivalent mutual inductances Lm and Lms are formed by mutual induction between the power transmission device np and the power reception device ns, and in the multi-resonant circuit constituted by Cr, Lr, Lm, Lms, Crs, and Lrs, the power transmission resonance circuit and the power reception resonance circuit resonate; a resonance current then flows in the mutual inductances Lm and Lms, an electromagnetic field resonance coupling is formed, and power is transmitted from the power transmission circuit to the power reception circuit. On the power transmission side, a resonance current flows in the capacitor Cr and the leakage inductance Lr. On the power reception side, a resonance current flows in the capacitor Crs and the leakage inductance Lrs, and power is supplied to a load after being rectified by the switch elements Q3 and Q4.

The system goes to state 4 when the switch element Q2 is turned off.

(4) State 4: Time t4 to t1

On the power transmitter Txp side, the parasitic capacitor Cds1 is discharged and the parasitic capacitor Cds2 is charged by the current it flowing in the leakage inductance Lr. The diode Dds1 becomes conductive and the system again goes to state 1 when the voltage vds1 becomes 0 V and the voltage vds2 becomes Vi.

Then, states 1 through 4 are periodically repeated thereafter.

Although a switching control circuit 20 detects a current flowing in the power reception device ns and turns the switch elements Q3 and Q4 on and off alternately in synchronization with the inversion of the polarity of that current in the example illustrated in FIG. 1, the configuration may be such that the power transmitter Txp transmits a switching timing signal to the power receiver Rxp for the switch elements Q1 and Q2 on the power transmitter side, and the switch elements Q3 and Q4 are driven on the power receiver Rxp in synchronization with the switching timing of the switch elements Q1 and Q2.

The power transmitter described above constitutes the power transmission resonance circuit along with the power transmission device np, and a resonance current is generated in the power transmission resonance circuit under the input of a DC power source Vi. An electromagnetic resonance field is generated as a result.

The stated resonance field is formed in a range of no greater than ⅕ the product of a switching period Ts (sec), which is the inverse of a switching frequency fs, and the speed of light (approximately 300,000 km/s), from the power transmission device np, the resonance device nsm, or the power reception device ns. In other words, the resonance field is formed within ⅕-wave length range from each device. For example, in the case where the switching frequency is 10 MHz, 1 wave length is approximately 30 m, and power can be supplied wirelessly in a range within ⅕ thereof, or approximately 6 m.

The following effects are achieved by employing the Peano curve-shaped power transmission device and power reception device according to the present disclosure.

The Peano curve basic shape element (a shape at step number n=1) functions as a differential coil, and thus unnecessary expansion of the electromagnetic resonance field can be suppressed and the electromagnetic field energy can be stored.

The surface area of each line length is small, and thus the device can be miniaturized.

The self-inductance of the fractal device as a whole is lower than in the case where a simple square coil (or circular coil) is used. Accordingly, it is not necessary to reduce the size in order to achieve a desired inductance, and a predetermined coupling can be achieved between devices that are distanced from each other to a certain extent.

A magnetic flux is present locally in the basic shape element, resulting in the distribution of a local self-inductance that mutually cancels out an induced voltage. There is thus an advantage that appropriate conditions for eliciting a resonance phenomenon can be set by connecting an external capacitance or the like, while reducing the apparent self-inductance.

The magnetic flux is closed locally within the basic element, which makes it difficult for the magnetic flux to spread to areas distanced from the device.

By using the device shape and appropriately setting the relative dispositions of the opposing devices, a magnetic energy distribution in the coils can be controlled.

Effects of a power transmission system constituted of the wireless power supply apparatus according to the present disclosure are as follows.

The electromagnetic field energy between the power transmission and reception devices can be increased more, which makes it possible to suppress spreading to the exterior.

By directly converting electrical energy and electromagnetic field energy, a wireless power supply system having little power loss can be achieved.

Electromagnetic field energy can be generated from a DC power source.

By providing a rectifying circuit in a load circuit, DC power can be obtained from the electromagnetic field energy.

Power can be supplied wirelessly as DC power to DC power.

A simple wireless power supply apparatus can be configured.

Power transmission can be controlled by a switching control circuit that controls switching operations.

By the switching element carrying out ZVS operations, power loss in the switching element can be greatly reduced.

Second Embodiment

A second embodiment describes several examples of conductor patterns of the power transmission device and the power reception device.

FIGS. 11(A) to (E) are diagrams illustrating conductor patterns formed from Peano curves having different primary shapes, and illustrate patterns at predetermined step numbers.

FIG. 12 is a diagram illustrating a conductor pattern formed from a three-dimensional Peano curve. FIG. 12(a)

indicates a pattern when the step number n=1, FIG. 12(*b*) when the step number n=2, and FIG. 12(*c*) and FIG. 12(*d*) when the step number n=3. Note that FIG. 12(*d*) also illustrates a thickness of the linear conductor three-dimensionally.

In this manner, the conductor patterns may have Peano curve shapes whose outer shapes are essentially cubic.

Third Embodiment

According to a third embodiment, when a switching frequency is represented by fs and a reactance of an input impedance when the load side as a whole is viewed from a power transmission resonance circuit connected to a power transmission switching circuit is represented by X, a resonance frequency where X=0 is represented by fa, and a switching control circuit in a wireless power supply apparatus causes the switching frequency fs to operate in the vicinity of the resonance frequency fa (fs=fr±30%).

Figure 13:
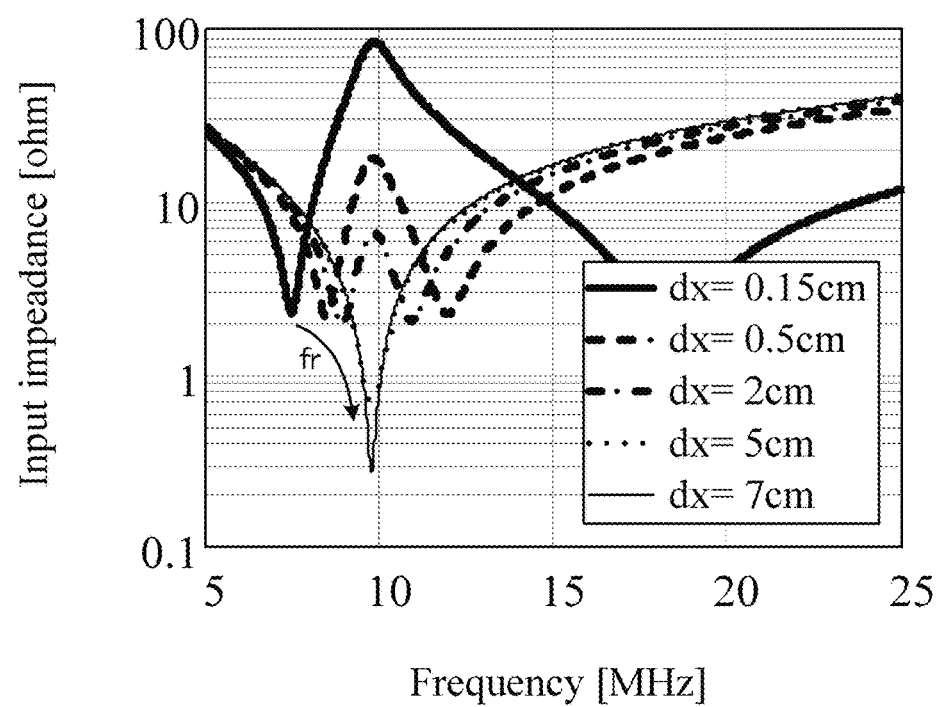
FIG. 13 is a diagram illustrating frequency characteristics of an input impedance on a load side as a whole, viewed from a power transmission resonance circuit input, in a wireless power supply apparatus according to a third embodiment.

FIG. 13 is a diagram illustrating frequency characteristics of the input impedance on a load side as a whole, viewed from a power transmission resonance circuit input, in the wireless power supply apparatus according to the third embodiment. Here, the resonance capacitors Cr and Crs have resonant frequencies near 10 MHz. When a load resistance Ro=10Ω and a distance dx is varied among 0.15, 0.5, 2.0, 5.0, and 7.0 cm, the input impedance and the resonant frequency fr at which the input impedance is at a minimum shift as indicated by the arrows in the drawing.

For example, when the power transmission distance dx=7 cm (70 mm), the resonant frequency fr≈10 MHz, and thus the switching frequency fs is assumed to be 10 MHz, for example.

By causing the switching frequency fs to operate near the resonance frequency fa, an electromagnetic resonance field can be formed. The resonance energy of the electromagnetic field increases at the resonance frequency, and the power transmission amount of the electromagnetic field energy increases as well. As a result, a large amount of power can be transmitted to locations with greater spaces in between. Furthermore, the wireless power supply apparatus can be made more efficient, smaller, and lighter in weight.

Fourth Embodiment

A switching control circuit in a wireless power supply apparatus according to a fourth embodiment causes the stated resonant frequency fr to operate at a lower state than the switching frequency fs. In other words, an input impedance of the multi-resonant circuit when viewed from the switching circuit is made inductive.

Figure 14:
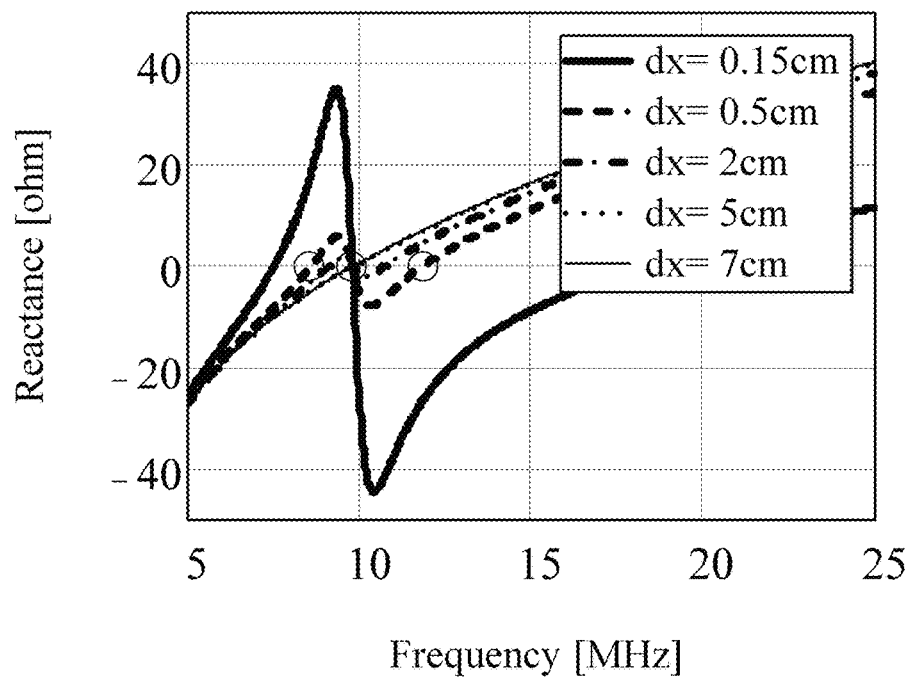
FIG. 14 is a diagram illustrating frequency characteristics of an input impedance reactance on a load side as a whole, viewed from a power transmission resonance circuit input, in a wireless power supply apparatus according to a fourth embodiment.

FIG. 14 is a diagram illustrating frequency characteristics of an input impedance reactance on a load side as a whole, viewed from a power transmission resonance circuit input, in the wireless power supply apparatus according to the fourth embodiment. Here, the resonance capacitors Cr and Crs have resonant frequencies near 10 MHz. When the load resistance Ro=10Ω and the distance dx is varied among 0.15, 0.5, 2.0, 5.0, and 7.0 cm, the stated reactance displaces as indicated in FIG. 14.

It can be seen that as the distance dx increases, there is a shift from dual-peak characteristics in which there are three frequencies where the reactance is 0 and two frequencies where the reactance is a maximum, to single-peak characteristics where there is a single frequency where the reactance is 0. Focusing on the reactance of the input impedance, it can be seen that inductance and capacitance switch at the borders of the three frequencies. The three circles in FIG. 14 indicate the frequencies at which the inductance and capacitance switch when dx=0.5 cm. To realize the ZVS operations, it is necessary to make the input impedance inductive and generate a lagging current with respect to voltage. The parasitic capacitors Cds1 and Cds2 of the switch element (FET) are charged and discharged during dead time by the lagging current. Accordingly, with dual-peak characteristics in which the magnetic coupling is strong, for example, it is necessary for the operating switching frequency fs to be within a frequency range in which the stated input impedance is inductive.

By setting the switching frequency in this manner, ZVS operations of the switching element can be carried out throughout the entire load range. Accordingly, power loss in the switching element can be greatly reduced. In addition, reducing the switching loss makes it possible to increase the efficiency, and the wireless power supply apparatus can be made smaller and lighter.

Fifth Embodiment

Figure 15:
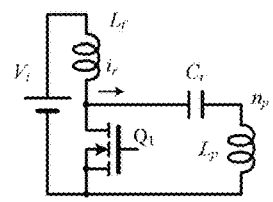
FIG. 15 is a circuit diagram illustrating a power transmitter in a wireless power supply apparatus according to a fifth embodiment.

FIG. 15 is a circuit diagram illustrating a power transmitter in a wireless power supply apparatus according to a fifth embodiment. In the example illustrated in FIG. 15, the configuration includes an inductor Lf having an inductance value of a magnitude at which a current source taken as a DC current relative to an AC current flowing in the power transmission device np can be generated from an input DC voltage, and only the one switch element Q1 is provided on the power transmission side. The inductance value of the inductor Lf is sufficiently greater than the inductance value of the power transmission device np, and can become high impedance at a switching frequency so that a variation in a current that flows therein is sufficiently small.

Figure 16:
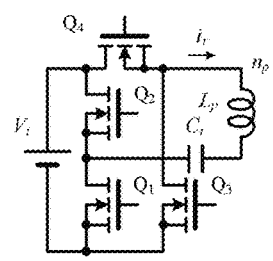
FIG. 16 is a circuit diagram illustrating a power transmitter in another wireless power supply apparatus according to the fifth embodiment.

FIG. 16 is a circuit diagram illustrating a power transmitter in the wireless power supply apparatus according to the fifth embodiment. In the example illustrated in FIG. 16, the four switch elements Q1 to Q4 configure a bridge circuit. The switch elements Q1 and Q4 turn on and off together, and the switch elements Q2 and Q3 turn off and on together. The switch elements Q1 and Q2 turn on and off in an alternating manner. In this manner, the power transmission switching circuit may have a full bridge configuration, and a resonance current may be produced by two sets of the bridge-connected four switch elements turning on and off in an alternating manner.

By employing a bridge configuration for the switch elements on the power transmitter side, the voltage applied to each switch element can be reduced, and the wireless power supply apparatus can be made more efficient, smaller, and lighter in weight.

Sixth Embodiment

FIGS. 17 to 21 are circuit diagrams illustrating a power receiver in a wireless power supply apparatus according to a sixth embodiment.

In the examples illustrated in FIG. 17(A) and FIG. 17(B), the power receiving-side rectifier circuit is constituted by a diode bridge circuit formed from the diodes Ds1, Ds2, Ds3, and Ds4. In the example illustrated in FIG. 15(B), the configuration is such that two resonance capacitors Crs1 and Crs2 are provided and a divided voltage of the two resonance capacitors Crs1 and Crs2 is rectified.

In the examples illustrated in FIG. 18(A) and FIG. 18(B), the power receiving-side rectifier circuit constitutes a half-wave rectifying circuit. The diode Ds1 rectifies a current flowing in the resonance capacitor Crs and supplies the current to a load. In the example illustrated in FIG. 18(B), the configuration is such that the two resonance capacitors Crs1 and Crs2 are provided and a divided voltage of the two resonance capacitors Crs1 and Crs2 is rectified.

In the examples illustrated in FIG. 19(A) and FIG. 19(B), the power receiving-side rectifier circuit constitutes a voltage doubler rectifying circuit. The diodes Ds1 and Ds2 rectify currents flowing in the resonance capacitors Crs1 and Crs2 and supply a doubled voltage to a load. In the example illustrated in FIG. 19(B), the configuration is such that three resonance capacitors Crs, Crs1, and Crs2 are provided and a divided voltage of the three resonance capacitors Crs, Crs1, and Crs2 is rectified.

In the examples illustrated in FIG. 20(A) and FIG. 20(B), the power receiving-side rectifier circuit constitutes a voltage doubler rectifying circuit. The diodes Ds1 and Ds2 double-voltage rectify a current flowing in the resonance capacitor Crs and supply a doubled voltage to a load.

In the examples illustrated in FIGS. 21(A) and 21(B), the power receiver includes power reception devices ns1 and ns2 having center taps. A rectifying circuit is connected to each of the power reception devices ns1 and ns2. This configures a center tap-type rectifying circuit. It is not absolutely necessary for the power reception devices ns1 and ns2 to be provided by drawing out a center tap, and two loop coils may be connected in series. In addition, it is not absolutely necessary for the two loop coils to be coupled to each other, and the power reception devices ns1 and ns2 may be orthogonal to each other. This broadens an azimuthal angle range (directivity) in which the power transmission device np and the power reception devices ns1 and ns2 can couple. In the example illustrated in FIG. 21(B), the configuration is such that the two resonance capacitors Crs1 and Crs3 are connected to the power reception device ns1, and a divided voltage of the two resonance capacitors Crs1 and Crs3 is rectified. Likewise, the configuration is such that two resonance capacitors Crs2 and Crs4 are connected to the power reception device ns2, and a divided voltage of the two resonance capacitors Crs2 and Crs4 is rectified.

Seventh Embodiment

A seventh embodiment describes a wireless power supply apparatus having a field resonator that includes at least one resonance device disposed in a near-field space where a power transmission device and a power reception device are present.

FIG. 22 is a diagram illustrating a resonance device nsm disposed between the power transmission device np and the power reception device ns. FIG. 23 is a diagram illustrating a state in which a field resonator FRxp is disposed nearby a power transmitter Txp. The resonance device nsm has the same configuration as the power transmission device np and the power reception device ns. Circuits connected to the power transmission device np and the power reception device ns are the same as those illustrated in FIG. 1 and FIG. 2. A capacitor C is connected to the resonance device nsm. A resonance/resonating circuit is constituted by the resonance device nsm and the capacitor C. This resonance/resonating circuit constitutes a resonance circuit with the inductive impedance of the resonance device nsm, the capacitive impedance, and the capacitor C.

When viewed as a geometric shape, the resonance device nsm is a fractal-shaped device formed from a conductor pattern in which parts have self-similarity with the whole, and increases the electromagnetic field energy in spaces in the periphery thereof.

Figure 24:
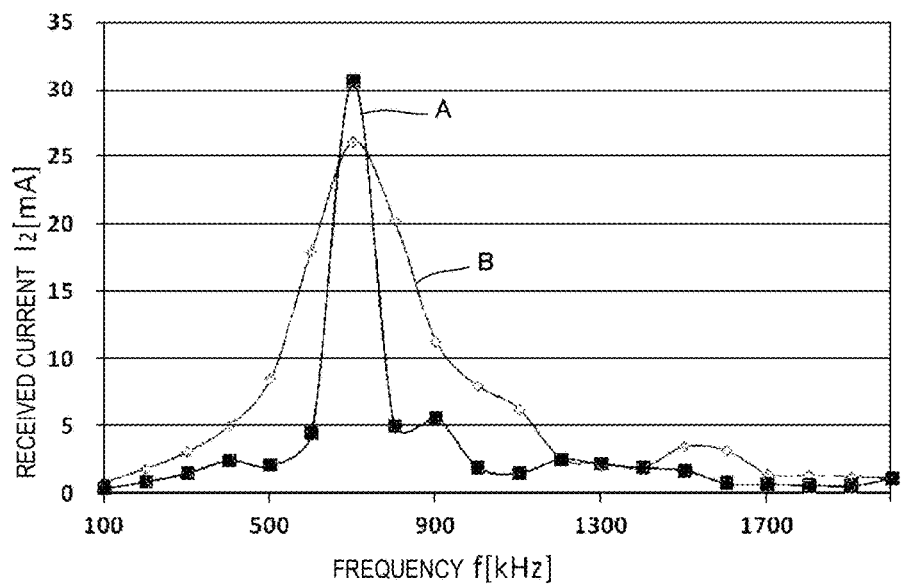
FIG. 24 is a diagram illustrating frequency characteristics of a current flowing in a power reception device.

FIG. 24 is a diagram illustrating frequency characteristics of a current flowing in a power reception device. Here, characteristics A indicate characteristics in the case where the resonance device nsm is provided, and characteristics B indicate characteristics in the case where the resonance device nsm is not provided. In the case where the resonance device nsm is provided, a Q value of the resonance characteristics is high, and a peak value of the current flowing in the power reception device is also high.

Figure 25:
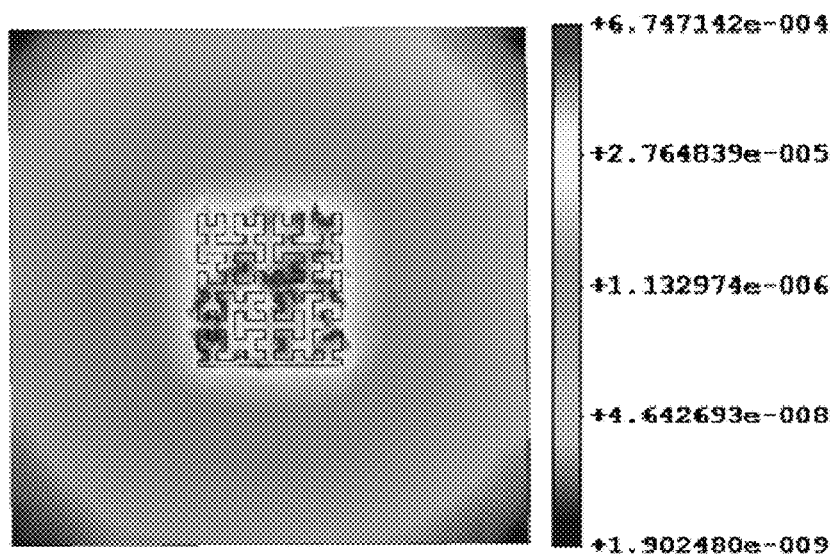
FIG. 25 is a diagram illustrating a magnetic flux density distribution in the power reception device np and the periphery thereof in the case where the resonance device nsm is provided.

FIG. 25 is a diagram illustrating a magnetic flux density distribution in the power reception device np and the periphery thereof in the case where the resonance device nsm is provided. In comparison with the characteristics in the case where the resonance device is not used (FIG. 8(A)), each magnetic flux density within the basic shape element of a corresponding fractal shape of the power reception device is high in the case where the resonance device is not used; however, in the case where the resonance device nsm is used, a region where the magnetic flux density distribution is high concentrates in a specific space, and a maximum value of the magnetic flux density is approximately four times the value when the resonance device nsm is not used. Thus, it can be seen that an effect of the resonance device produces a high magnetic flux density in a specific region within the coil surface.

Figure 26:
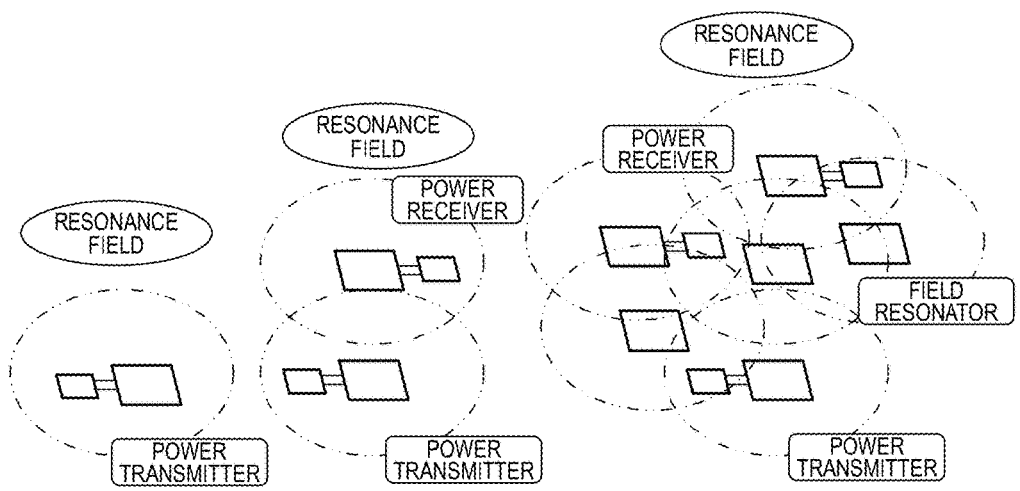
FIG. 26 is a conceptual diagram illustrating expansion of an electromagnetic resonance field.

FIG. 26 is a conceptual diagram illustrating expansion of an electromagnetic resonance field. First, the power transmitter forms an electromagnetic resonance field using a DC voltage. When the power receiver is placed within this electromagnetic resonance field, the power receiver expands the electromagnetic resonance field. The electromagnetic resonance field further expands when the field resonator is placed in the electromagnetic resonance field. In other words, by obtaining electrical energy from the resonance field produced by the power transmission device np, the resonance device nsm produces a resonance current, and a new electromagnetic resonance field is formed (expanded) by the resonance current. The electromagnetic resonance field further expands when the field resonator is placed in the electromagnetic resonance field. The power transmitter, the power receiver, and the field resonator are present in a near-field of the power transmission frequency.

The wireless power supply apparatus including the field resonator has the following effects.

The electromagnetic resonance field can be expanded by using the resonance device.

The transmission distance for power transmission and reception can be increased by the resonance device.

Using a capacitive impedance of the resonance device as a resonance capacitor renders an external resonance capacitor unnecessary.

A region having a comparatively high magnetic flux density can be produced across the entire surface of the resonance device.

A region having a high magnetic flux density distribution is produced near the resonance device, and thus the region having a high magnetic flux density distribution can be concentrated in a specific space in accordance with where the resonance device is disposed.

Eighth Embodiment

Figure 27:
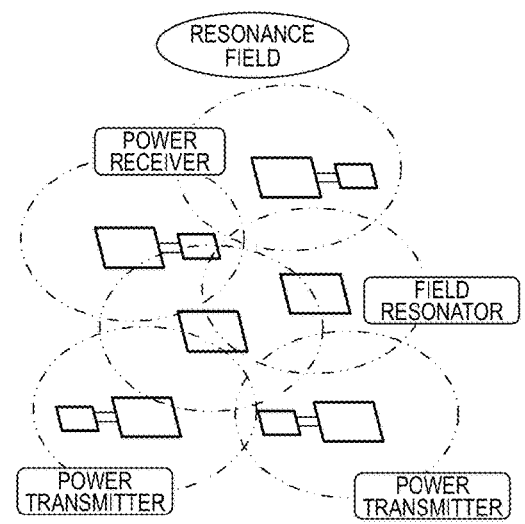
FIG. 27 illustrates an example of strengthening a resonance field by disposing a plurality of power transmitters and a plurality of power receivers.
Figure 28:
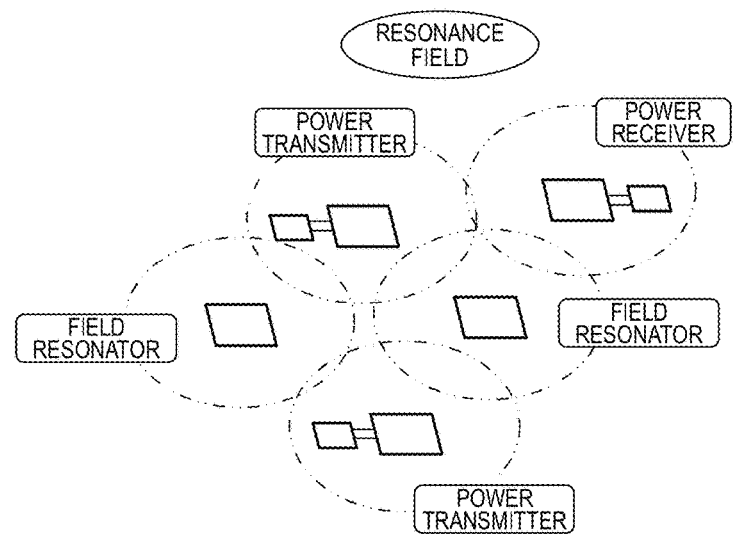
FIG. 28 is a general schematic diagram illustrating a wireless power supply apparatus including a plurality of power transmitters and a plurality of power receivers.

FIG. 27 and FIG. 28 are general schematic diagrams illustrating a wireless power supply apparatus including a plurality of power transmitters and a plurality of power receivers. In particular, FIG. 27 illustrates an example of strengthening a resonance field by disposing a plurality of power transmitters and a plurality of power receivers. FIG. 28 illustrates an example of expanding a resonance field by disposing a plurality of power transmitters and a plurality of power receivers.

In this manner, the electromagnetic resonance field can be expanded by using a plurality of power transmitters and a plurality of power receivers. Furthermore, the amount of transmitted power can be increased by using a plurality of power transmitters. Further still, power can be supplied to a plurality of loads located apart from each other by using a plurality of power receivers. In addition, by expanding the electromagnetic resonance field using a plurality of power transmitters and a plurality of field resonators, the freedom of positions at which a power receiver can receive power can be increased.

Ninth Embodiment

Figure 29:
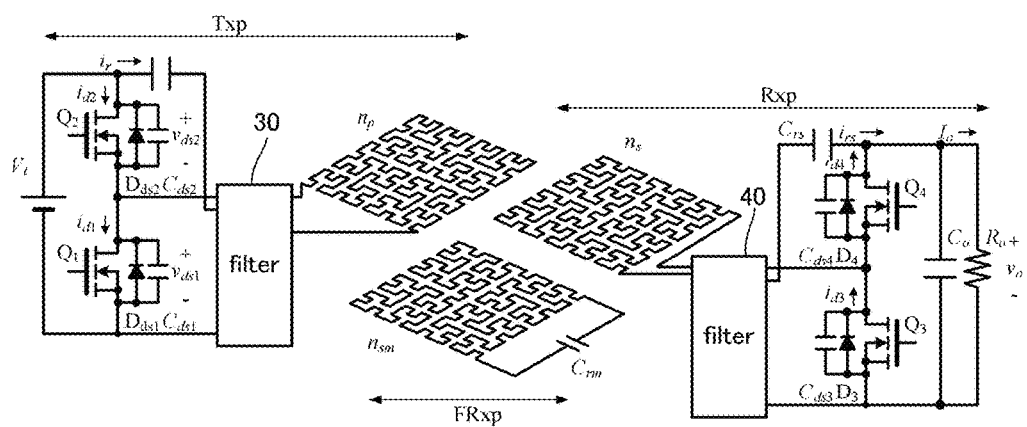
FIG. 29 is a circuit diagram illustrating a wireless power supply apparatus according to a ninth embodiment.

FIG. 29 is a circuit diagram illustrating a wireless power supply apparatus according to a ninth embodiment. In this example, a filter 30 is provided between the power transmission device np and the power transmission circuit. In addition, a filter 40 is provided between the power reception device ns and the power reception circuit. The rest is the same as the configuration illustrated in FIG. 1.

The stated filters 30 and 40 are band pass filters that allow power in the resonance frequency to pass and remove (reflect) power in frequencies outside of the resonance frequency. By providing such filters, the occurrence of unnecessary noise can be suppressed, which in turn makes it possible to reduce electromagnetic interference problems with respect to peripheral devices and achieve electromagnetic compatibility (EMC).

Using an ISM (Industry-Science-Medical) band as the magnetic field resonance frequency makes it possible to reduce electromagnetic interference problems with respect to peripheral devices. A frequency near 6.7 MHz, 13.56 MHz, or 27.12 MHz, for example, is used as this ISM band.

Tenth Embodiment

Figure 30:
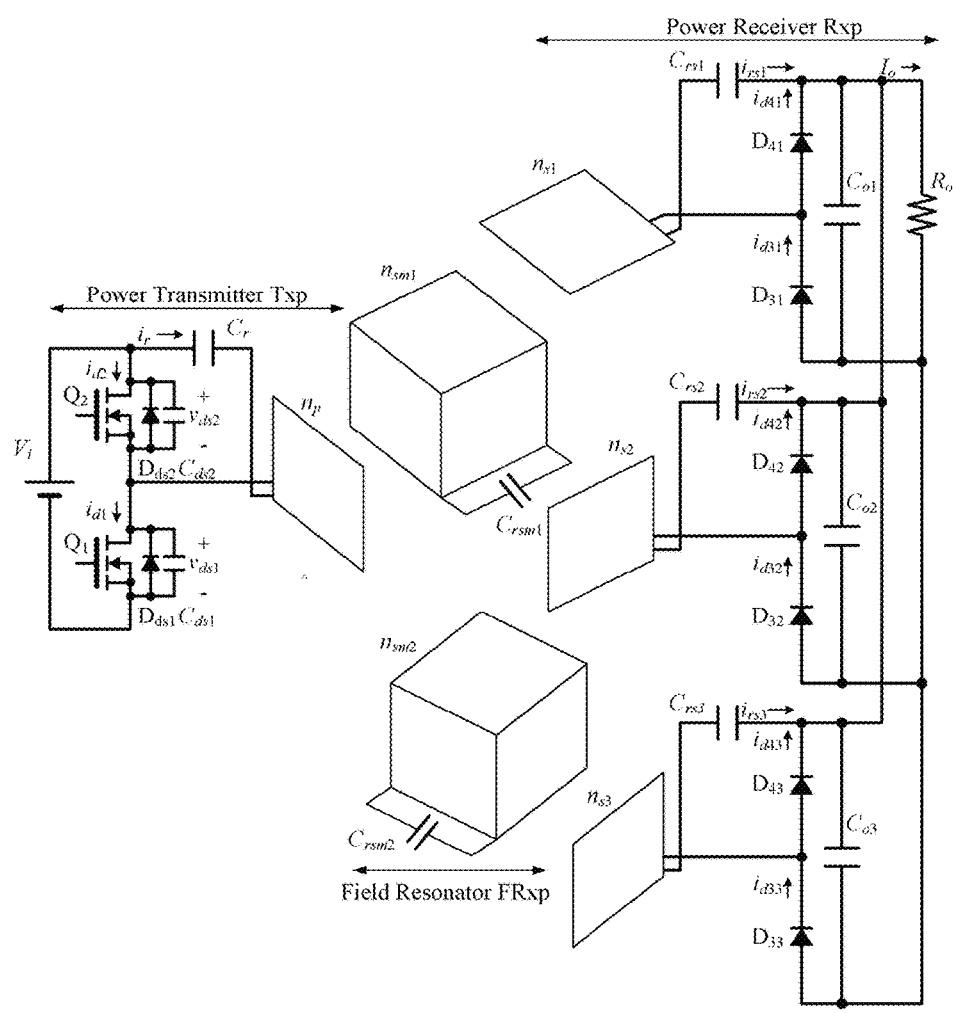
FIG. 30 is a circuit diagram illustrating a wireless power supply apparatus according to a tenth embodiment.

FIG. 30 is a circuit diagram illustrating a wireless power supply apparatus according to a tenth embodiment. This apparatus includes a power transmitter Txp having the power transmission device np, a field resonator FRxp having the resonance device nsm, and a power receiver Rxp having the power reception device ns.

The power receiver Rxp pairs a power reception circuit constituted by a resonance capacitor Crs1, rectifying diodes D41 and D31, and a smoothing capacitor Co1 with a power reception device ns1, a power reception circuit constituted by a resonance capacitor Crs2, rectifying diodes D42 and D32, and a smoothing capacitor Cot with a power reception device ns2, and a power reception circuit constituted by a resonance capacitor Crs3, rectifying diodes D43 and D33, and a smoothing capacitor Co3 with a power reception device ns3. The configuration is such that outputs of the three power reception circuits are connected in parallel and DC power is supplied to a single load Ro.

In this example, a field resonator FRxp constituted by a resonance device nsm1 and a resonance capacitor Crsm1 and a field resonator FRxp constituted by a resonance device nsm2 and a resonance capacitor Crsm2 are provided.

The resonance devices nsm1 and nsm2 are fractal devices having cubic outer shapes. For example, the devices are constituted by conductor patterns having the three-dimensional Hilbert curves illustrated in FIG. 12. The power transmission device np and the power reception devices ns1, ns2, and ns3 are conductor patterns formed as Hilbert curves having square outer shapes. The outer shapes of the power transmission device np and the power reception devices ns1, ns2, and ns3 are of essentially the same size as one surface of the resonance devices nsm1 and nsm2. Each device has the same number of steps.

In this manner, the configuration may be such that a plurality of power reception devices are disposed in respectively different locations and the electrical energy received by the respective power reception devices is collected and supplied to a load. Through this, power can be supplied to power reception devices in a variety of three-dimensional directions. Furthermore, the amount of electrical energy that can be supplied to a load can be increased easily.

Eleventh Embodiment

Figure 31:
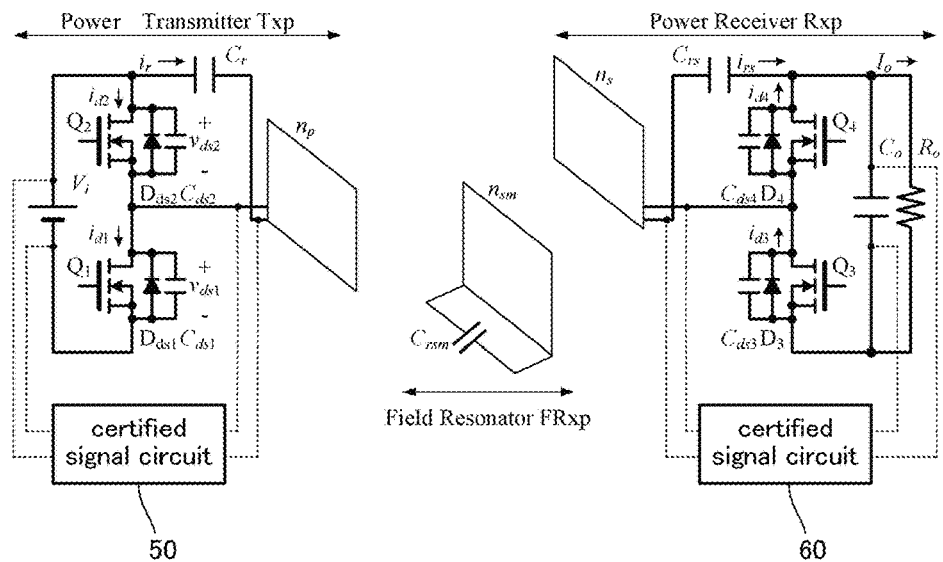
FIG. 31 is a circuit diagram illustrating a wireless power supply apparatus according to an eleventh embodiment.

FIG. 31 is a circuit diagram illustrating a wireless power supply apparatus according to an eleventh embodiment. In this wireless power supply apparatus, the power transmitter includes a certified signal circuit 50 that operates with an input power source Vi as a power source and that uses the power transmission device np as a communication coil (a near-field antenna). Likewise, the power receiver includes a certified signal circuit 60 that operates with a rectified and smoothed voltage as a power source and that uses the power reception device ns as a communication coil (a near-field antenna). In other words, the power transmission device np and the power reception device ns have dual roles of power transmission and signal communication. This makes it possible to make the power transmitter smaller and lighter in weight.

A communication signal takes the power transmission frequency as a carrier frequency, and is multiplexed by modulating that frequency. As such, the communication signal is also transmitted through the electromagnetic resonance field. Through this communication, various types of data and timing signals for a suitable (target) power receiver can be transmitted from the power transmitter. Alternatively, various types of data and timing signals for a suitable (target) power transmitter can be transmitted from the power receiver. For example, various types of states on the power transmitter side or various types of states on the power receiver side can be exchanged with each other. Alternatively, the power receiver can also carry out synchronous rectification in synchronization with switching of the switch elements in the power transmitter.

Signal transmission differs from power transmission in that poor power transmission efficiency does not lead to an increase in loss, and thus the stated communication signal may be made independent from the frequency for power transmission.

In the example illustrated in FIG. 31, the certified signal circuits 50 and 60 are provided in the power transmitter and the power receiver, but the field resonator FRxp may include a communication circuit along with a rectifying and smoothing circuit.

Twelfth Embodiment

A twelfth embodiment describes an example in which the power transmission device, the power reception device, and the resonance device each has a different conductor pattern.

Figure 32:
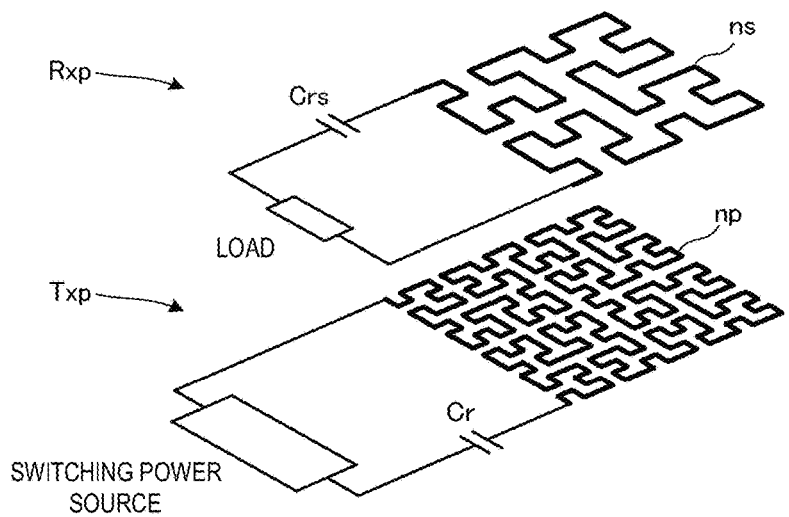
FIG. 32 is a diagram illustrating an example of shapes and dispositions of conductor patterns in a power transmission device and a power reception device.

FIG. 32 is a diagram illustrating an example of shapes and dispositions of conductor patterns in a power transmission device and a power reception device. In FIG. 32, the power transmission device np of the power transmitter Txp has a four-step Hilbert curve, and the power reception device ns of the power receiver Rxp has a three-step Hilbert curve.

As in the relationship between the power transmission device np and the power reception device ns in this example, the conductor patterns that couple may be fractal-shaped devices in which the step (generation) numbers n have different relationships. Due to the characteristic of fractal shapes, that is, that the parts are analogous to the whole, a magnetic field produced by each segment of a conductor pattern having a small number of steps corresponds to an average magnetic field produced by a plurality of continuous segments in a conductor pattern having a large number of steps; as such, even devices formed from Peano curve-shaped conductors in which the step numbers n have different relationships will couple with each other.

Thirteenth Embodiment

Figure 33:
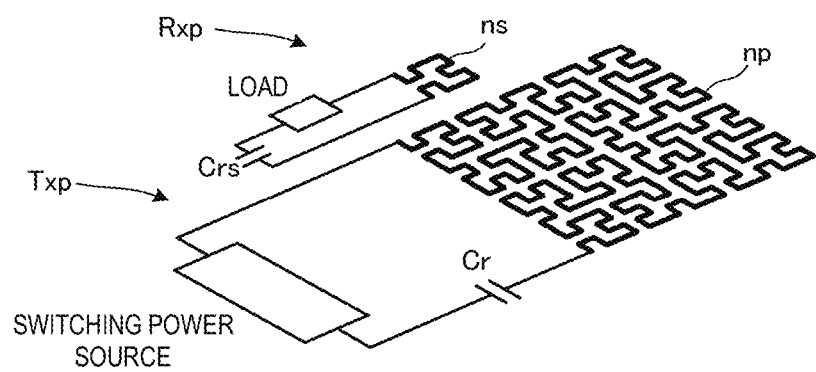
FIG. 33 is a diagram illustrating an example of shapes and dispositions of conductor patterns in a power transmission device and a power reception device.

FIG. 33 is a diagram illustrating an example of shapes and dispositions of conductor patterns in a power transmission device and a power reception device. In FIG. 33, the power transmission device np of the power transmitter Txp has a four-step Hilbert curve, and the power reception device ns of the power receiver Rxp has a single-step Hilbert curve. However, the size of one side of the power reception device ns is ⅛ the size of one side of the power transmission device np. Accordingly, the pattern of the power reception device ns matches a part of the pattern of the power transmission device np.

Figure 34:
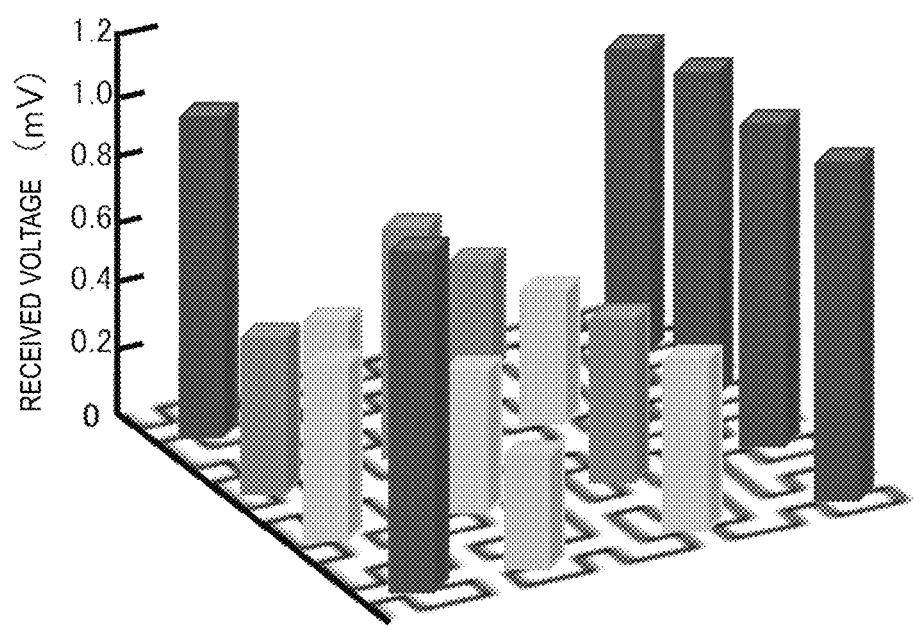
FIG. 34 is a diagram illustrating a distribution of voltage induced in a power reception device conductor pattern.

FIG. 34 is a diagram illustrating a distribution of voltage induced in a power reception device conductor pattern. By the entirety of one conductor pattern matching part of the other conductor pattern in this manner, a high induced voltage (that is, a received voltage) is produced.

Even when the devices have different sizes as per the relationship between the power transmission device np and the power reception device ns in this example, a high degree of coupling is achieved by the entirety of the one conductor pattern matching a part of the other conductor pattern.

Fourteenth Embodiment

Figure 35:
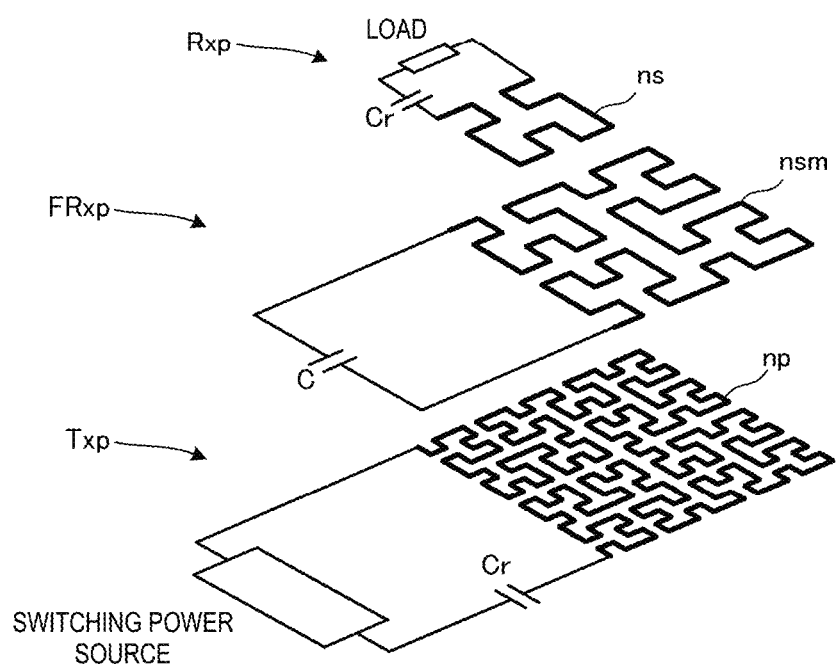
FIG. 35 is a diagram illustrating an example of dispositions of a power transmitter, a power receiver, and a field resonator, and of shapes of a power transmission device, a power reception device, and a resonance device.

FIG. 35 is a diagram illustrating an example of dispositions of a power transmitter, a power receiver, and a field resonator, and of shapes of a power transmission device, a power reception device, and a resonance device. In FIG. 35, the power transmission device np of the power transmitter Txp has a four-step Hilbert curve, the resonance device nsm of the field resonator FRxp has a three-step Hilbert curve, and the power reception device ns of the power receiver Rxp has a two-step Hilbert curve. However, while the power transmission device np and the resonance device nsm have essentially the same outer size, the size of the power reception device ns is ¼ the outer size of the resonance device nsm. Accordingly, the pattern of the power reception device ns matches a part of the pattern of the resonance device nsm.

As in the relationship between the power transmission device np and the resonance device nsm in this example, the conductor patterns that couple may be Peano curve-shaped conductors in which the step (generation) numbers n have different relationships. As in the example illustrated in FIG. 32, even Peano curve-shaped conductors in which the step numbers n have different relationships will couple with each other.

In addition, even when the fractal devices have different sizes as per the relationship between the resonance device nsm and the power reception device ns in this example, a high degree of coupling is achieved by the entirety of the one conductor pattern matching a part of the other conductor pattern, in the same manner as in the example illustrated in FIG. 33.

This configuration makes it possible to accommodate limitations in the placement of devices.

Although the foregoing embodiments describe examples in which a plurality of power receivers that receive power from a common power transmitter are provided, power may be supplied to a common power receiver from a plurality of power transmitters.

In addition, the configuration may be such that the electrical energy received by a plurality of power receivers is collected and DC power is supplied to one or a plurality of loads.

Furthermore, in several embodiments described above, the power transmission device, the power reception device, and the resonance device are each described as being planar devices in which the linear conductor patterns are spread along a surface, but the entire surface may be curved or bent.

The invention claimed is:

1. A wireless power supply apparatus comprising:
a power transmitter including a power source that supplies an AC current and a power transmission device electrically connected to the power source;
a power receiver including a load that consumes electrical energy and a power reception device electrically connected to the load;
a power transmission resonance circuit constituted by an inductive impedance and a capacitive impedance of the power transmission device;
a power reception resonance circuit constituted by an inductive impedance and a capacitive impedance of the power reception device; and
a power reception load circuit that is electrically connected to the power reception resonance circuit and that supplies electrical energy produced by an AC current to the load,
wherein the power transmitter and the power receiver are disposed with a space provided therebetween;
the power transmission device produces an electromagnetic field that periodically changes using the AC current in a space, and forms a vibrating electromagnetic resonance field in which the space itself has energy;
the power reception device provides an AC current by obtaining electrical energy from the resonance field and forms a new electromagnetic resonance field using the AC current;
the power transmission device or the power reception device is constituted by a differential coil structure in all locations by having a continuous conductor having a Peano curve shape that covers a surface having a given spread by passing through all regions obtained by dividing the surface having a given spread without intersecting with itself, and the electromagnetic field energy of a space where the power transmission device and the power reception device are disposed is increased locally; and
the power source that supplies the AC current provides a relationship of fs=fr±30% for a frequency fs of the AC current relative to a resonant frequency fr at which an imaginary part X of an equivalent input impedance when a load side is viewed as a whole from the input to which the power source of the power transmission resonance circuit is connected becomes 0.

2. The wireless power supply apparatus according to claim 1,
wherein the electromagnetic resonance field is formed in a range of no greater than ⅕ the product of a switching period Ts (sec), which is an inverse of the frequency fs of the AC current, and the speed of light, from the power transmission device or the power reception device.

3. The wireless power supply apparatus according to claim 1, further comprising:
a field resonator including at least one resonance device disposed in a near-field space where the power transmission device and the power reception device are present; and
a resonance/resonating circuit constituted by an inductive impedance and a capacitive impedance of the resonance device or an external impedance,
wherein the resonance device produces an AC current by obtaining electrical energy from the electromagnetic resonance field and forms a new electromagnetic resonance field using the AC current; and
the resonance device is constituted by a differential coil structure in all locations by having a continuous conductor having a Peano curve shape that covers a surface having a given spread by passing through all regions obtained by dividing the surface having a given spread without intersecting with itself, and the electromagnetic field energy of a space where the resonance device is disposed is increased locally.

4. The wireless power supply apparatus according to claim 3,
wherein the conductor of the resonance device has a step number n of two or more, and an outer shape thereof is essentially square or essentially cubic.

5. The wireless power supply apparatus according to claim 4,
wherein the conductor of the resonance device is a Peano curve-shaped conductor whose step number n is different from that of the conductor of the power transmission device or the power reception device.

6. The wireless power supply apparatus according to claim 3,
wherein resonant frequencies independently present in the power transmission resonance circuit and the resonance/resonating circuit match within a range of ±30%.

7. The wireless power supply apparatus according to claim 3,
wherein a plurality of field resonators are disposed in the near-field space.

8. The wireless power supply apparatus according to claim 7,
wherein resonant frequencies independently present in the plurality of resonance/resonating circuits match within a range of ±30%.

9. The wireless power supply apparatus according to claim 3,
wherein the field resonator includes a certified signal circuit that communicates via radio waves with the power transmitter or the power receiver.

10. The wireless power supply apparatus according to claim 1,
wherein the conductor of the power transmission device or the power reception device has a step number n of two or more, and an outer shape thereof is essentially square or essentially cubic.

11. The wireless power supply apparatus according to claim 10,
wherein the conductor of the power transmission device is a Peano curve-shaped conductor whose step number n is different from that of the conductor of the power reception device.

12. The wireless power supply apparatus according to claim 1,
wherein the power reception load circuit has a rectifying circuit and supplies DC electrical energy to the load.

13. The wireless power supply apparatus according to claim 1,
wherein resonant frequencies independently present in the power transmission resonance circuit and the power reception resonance circuit match within a range of ±30%.

14. The wireless power supply apparatus according to claim 1,
wherein a plurality of the power transmitters are disposed, and a frequency of the AC current of each power transmitter is the same within a ±30% range.

15. The wireless power supply apparatus according to claim 1,
wherein a plurality of the power receivers are disposed, and a resonant frequency of the power reception resonance circuit each power receiver has is the same within a ±30% range.

16. The wireless power supply apparatus according to claim 1,
wherein a plurality of the power reception devices are disposed, and electrical energy received by the respective power reception devices is collected and supplied to a load.

17. The wireless power supply apparatus according to claim 1,
wherein a plurality of the power transmitters are disposed, and a frequency of the AC current of each power transmitter is an ISM (Industry-Science-Medical) band.

18. The wireless power supply apparatus according to claim 1,
wherein the power transmitter includes a filter that removes frequency components aside from the frequency of the AC current.

19. The wireless power supply apparatus according to claim 1,
wherein the power transmitter and the power receiver each include a certified signal circuit that communicates via radio waves.

20. The wireless power supply apparatus according to claim 1,
wherein the power transmission resonance circuit further includes an electrically connected external impedance.

21. The wireless power supply apparatus according to claim 1,
wherein the power reception resonance circuit further includes an electrically connected external impedance.

* * * * *